United States Patent
Hoole et al.

(10) Patent No.: US 11,539,753 B2
(45) Date of Patent: Dec. 27, 2022

(54) NETWORK-ACCESSIBLE SERVICE FOR EXECUTING VIRTUAL MACHINES USING CLIENT-PROVIDED VIRTUAL MACHINE IMAGES

(71) Applicant: Amazon Technologies, Inc., Seattle, WA (US)

(72) Inventors: Quinton R. Hoole, Cape Town (ZA); Roland Paterson-Jones, Cape Town (ZA); Christopher C. Pinkham, Cape Town (ZA); Benjamin Tobler, Cape Town (ZA); Willem R. van Biljon, Cape Town (ZA); Gabriel Smit, Cape Town (ZA); Christopher Brown, Cape Town (ZA)

(73) Assignee: Amazon Technologies, Inc., Seattle, WA (US)

( * ) Notice: Subject to any disclaimer, the term of this patent is extended or adjusted under 35 U.S.C. 154(b) by 135 days.

(21) Appl. No.: 17/033,472

(22) Filed: Sep. 25, 2020

(65) Prior Publication Data

US 2021/0014279 A1  Jan. 14, 2021

Related U.S. Application Data

(63) Continuation of application No. 16/460,989, filed on Jul. 2, 2019, now Pat. No. 10,791,149, which is a
(Continued)

(51) Int. Cl.
*H04L 12/14* (2006.01)
*H04L 9/40* (2022.01)
(Continued)

(52) U.S. Cl.
CPC .......... *H04L 63/20* (2013.01); *G06F 9/45558* (2013.01); *H04L 12/1439* (2013.01);
(Continued)

(58) Field of Classification Search
CPC ......... H04L 29/08; H04L 29/06; H04L 41/22; H04L 41/0813; H04L 12/24;
(Continued)

(56) References Cited

U.S. PATENT DOCUMENTS 5,974,454 A  10/1999 Apfel et al.
6,064,978 A   5/2000 Gardner et al.
(Continued)

FOREIGN PATENT DOCUMENTS

JP  2001-273432 A  10/2001
JP  2002-49786 A   2/2002
(Continued)

OTHER PUBLICATIONS

"Grid Computing Solutions," Sun Microsystems, Inc, retrieved May 3, 2006, from http://www.sun.com/software/grid, 3 pages.
(Continued)

*Primary Examiner* — Wei Zhao
(74) *Attorney, Agent, or Firm* — Robert C. Kowert; Kowert, Hood, Munyon, Rankin & Goetzel, P.C.

(57) ABSTRACT

Techniques are described for managing communications between multiple intercommunicating computing nodes, such as multiple virtual machine nodes hosted on one or more physical computing machines or systems. In some situations, users may specify groups of computing nodes and optionally associated access policies for use in the managing of the communications for those groups, such as by specifying which source nodes are allowed to transmit data to particular destinations nodes. In addition, determinations of whether initiated data transmissions from source nodes to destination nodes are authorized may be dynamically negotiated for and recorded for later use in automatically authorizing future such data transmissions without negotiation. This abstract is provided to comply with rules requiring an
(Continued)

abstract, and it is submitted with the intention that it will not be used to interpret or limit the scope or meaning of the claims.

20 Claims, 17 Drawing Sheets

Related U.S. Application Data continuation of application No. 15/479,142, filed on Apr. 4, 2017, now Pat. No. 10,348,770, which is a continuation of application No. 14/928,659, filed on Oct. 30, 2015, now Pat. No. 9,621,593, which is a continuation of application No. 13/843,287, filed on Mar. 15, 2013, now Pat. No. 9,253,211, which is a continuation of application No. 12/859,098, filed on Aug. 18, 2010, now Pat. No. 8,509,231, which is a continuation of application No. 11/394,595, filed on Mar. 31, 2006, now Pat. No. 7,801,128.

(51) Int. Cl.
| H04L 67/01 | (2022.01) |
| H04L 41/22 | (2022.01) |
| H04L 41/0813 | (2022.01) |
| H04L 67/10 | (2022.01) |
| G06F 9/455 | (2018.01) |
| H04L 67/1097 | (2022.01) |

(52) U.S. Cl.
CPC ...... *H04L 12/1442* (2013.01); *H04L 41/0813* (2013.01); *H04L 41/22* (2013.01); *H04L 63/10* (2013.01); *H04L 63/102* (2013.01); *H04L 67/01* (2022.05); *H04L 67/10* (2013.01); *H04L 67/1097* (2013.01); *G06F 2009/45587* (2013.01); *G06F 2009/45595* (2013.01)

(58) Field of Classification Search
CPC ............ H04L 12/1439; H04L 12/1442; H04L 67/1097; H04L 67/42; H04L 63/20; H04L 63/102; G06F 9/45558; G06F 2009/45595; G06F 2009/45587
See application file for complete search history.

(56) References Cited

U.S. PATENT DOCUMENTS

| | | | |
|---|---|---|---|
| 6,170,012 B1 | 1/2001 | Coss et al. | |
| 6,185,409 B1 | 2/2001 | Threadgill et al. | |
| 6,408,336 B1 | 6/2002 | Schneider et al. | |
| 6,411,967 B1 | 6/2002 | Van Renesse | |
| 6,430,607 B1 | 8/2002 | Kavner | |
| 6,457,047 B1 | 9/2002 | Chandra et al. | |
| 6,529,953 B1 | 3/2003 | Van Renesse | |
| 6,724,770 B1 | 4/2004 | Van Renesse | |
| 6,782,398 B1 | 8/2004 | Bahl | |
| 6,810,291 B2 | 10/2004 | Card et al. | |
| 7,076,633 B2 | 7/2006 | Tormasov et al. | |
| 7,139,821 B1 | 11/2006 | Shah et al. | |
| 7,316,000 B2 | 1/2008 | Poole et al. | |
| 7,430,610 B2 | 9/2008 | Pace et al. | |
| 7,640,296 B2 | 12/2009 | Fuchs et al. | |
| 7,801,128 B2 | 9/2010 | Hoole et al. | |
| 7,840,962 B2 | 11/2010 | Neiger et al. | |
| 8,041,761 B1* | 10/2011 | Banga ............... G06Q 20/382 |
| | | | 705/52 |
| 9,253,211 B2 | 2/2016 | Hoole et al. | |
| 2001/0000811 A1 | 5/2001 | May et al. | |
| 2001/0056500 A1 | 12/2001 | Farber et al. | |
| 2002/0002613 A1 | 1/2002 | Freeman et al. | |
| 2002/0082858 A1 | 6/2002 | Heddaya et al. | |
| 2002/0112076 A1 | 8/2002 | Rueda et al. | |
| 2002/0122420 A1 | 9/2002 | Yuan et al. | |
| 2002/0198953 A1 | 12/2002 | O'Rourke et al. | |
| 2003/0028642 A1 | 2/2003 | Agarwal et al. | |
| 2003/0041311 A1 | 2/2003 | Poole et al. | |
| 2003/0145038 A1 | 7/2003 | Bin Tariq et al. | |
| 2003/0154284 A1 | 8/2003 | Bernardin et al. | |
| 2003/0191695 A1 | 10/2003 | Kondo et al. | |
| 2004/0010572 A1 | 1/2004 | Watanabe | |
| 2004/0044731 A1 | 3/2004 | Chen et al. | |
| 2004/0059805 A1 | 3/2004 | Dinker et al. | |
| 2004/0165588 A1 | 8/2004 | Pandya | |
| 2005/0168782 A1 | 8/2005 | Kobashi et al. | |
| 2005/0283759 A1 | 12/2005 | Peteanu et al. | |
| 2005/0283784 A1 | 12/2005 | Suzuki | |
| 2006/0047813 A1 | 3/2006 | Aggarwal et al. | |
| 2006/0143359 A1* | 6/2006 | Dostert ............... G06F 11/3636 |
| | | | 711/6 |
| 2006/0184936 A1 | 8/2006 | Abels et al. | |
| 2006/0259581 A1 | 11/2006 | Piersol | |
| 2007/0169120 A1 | 7/2007 | Schoenberg et al. | |
| 2009/0113088 A1 | 4/2009 | Illowsky et al. | |
| 2013/0159021 A1* | 6/2013 | Felsher ................ G16H 10/60 |
| | | | 705/3 |

FOREIGN PATENT DOCUMENTS

| | | |
|---|---|---|
| JP | 2002-230344 A | 8/2002 |
| JP | 2002-236839 A | 8/2002 |
| JP | 2002-297924 A | 10/2002 |
| WO | 2002/0099695 A1 | 12/2002 |

OTHER PUBLICATIONS

"Grid Offerings," Java net, retrieved May 3, 2006, from http://wiki.java.net/bin/view/Sungrid/OtherGridOfferings, 8 pages.
"Recent Advances Boost System Virtualization," eWeek.com, retrieved May 3, 2006, from http://eweek.com/article2/0,1895,1772626,00.asp, 5 pages.
"Scalable Trust of Next Generation Management (STRONGMAN)," retrieved May 17, 2006, from http://www.cis.upenn.edu/~dsl/STRONGMAN/, 4 pages.
"Sun EDA Compute Ranch," Sun Microsystems, Inc., retrieved May 3, 2006, from http://sun.com/processors/ranch/brochure.pdf, 2 pages.
"Sun Microsystems Accelerates UltraSPARC Processor Design Program With New Burlington, Mass. Compute Ranch," Nov. 6, 2002, Sun Microsystems, Inc., retrieved May 3, 2006, from http://www.sun.com/smi/Press/sunflash/2002-11/sunflash.20021106.3.xml, 2 pages.
"Sun N1 Grid Engine 6," Sun Microsystems, Inc., retrieved May 3, 2006, from http://sun.com/software/gridware/index.xml, 3 pages.
"Sun Opens New Processor Design Compute Ranch," Nov. 30, 2001, Sun Microsystems, Inc., retrieved May 3, 2006, from http://www.sun.com/smi/Press/sunflash/2001-11/sunflash.20011130.1.xml, 3 pages.
"The Reverse Firewall™: Defeating DDoS Attacks Emerging from Local Area Networks," Cs3, Inc., retrieved Nov. 11, 2005, from http://www.cs3-inc.com/rfw.html, 4 pages.
"The Softricity Desktop," Softricity, retrieved May 3, 2006, from http://www.softricitv.com/products/, 3 pages.
Bellovin, S., "Distributed Firewalls," Nov. 1999, issue of ;login:, pp. 37-39, retrieved Nov. 11, 2005, from http://www.cs.columbia.edu/~smb/papers/distfw.html, 10 pages.
Blaze, M., "Using the KeyNote Trust Management System," Mar. 1, 2001, retrieved May 17, 2006, from http://www.crypto.com/trustmgt/kn.html, 4 pages.
Brenton, C., "What is Egress Filtering and How Can I Implement it?—Egress Filtering v 0.2," Feb. 29, 2000, SANS Institute, http://www.sans.org/infosecFAQ/firewall/egress.htm, 6 pages.
Coulson, D., "Network Security Iptables," Mar. 2003, Linuxpro, Part 1, retrieved from http://davidcoulson.net/writing/xf/38/iptables.pdf, 4 pages.
Coulson, D., "Network Security Iptables," Apr. 2003, Linuxpro, Part 2, retrieved from http://davidcoulson.net/writing/xf/39/iptables.pdf, 4 pages.

(56) References Cited

OTHER PUBLICATIONS

Demers, A., "Epidemic Algorithms for Replicated Database Maintenance," 1987, Proceedings of the sixth annual ACM Symposium on Principles of distributed computing, Vancouver, British Columbia, Canada, Aug. 10-12, 1987, 12 pages.
Gruener, J., "A vision of togetherness," May 24, 2004, NetworkWorld, retrieved May 3, 2006, from, http://www.networkworld.com/supp/2004/ndc3/0524virt.html, 9 pages.
Ioannidis, S., et al., "Implementing a Distributed Firewall," Nov. 2000, (ACM) Proceedings of the ACM Computer and Communications Security (CCS) 2000, Athens, Greece, pp. 190-199, retrieved from http://www.cis.upenn.edu/~dsl/STRONGMAN/Papers/df.pdf, 10 pages.
Kenshi, P., "Help File Library: Iptables Basics," Justlinux, retrieved Dec. 1, 2005, from http://www.justlinux.com/nhf/Security/Iptables_Basics.html, 4 pages.
Shankland, S., "Sun to buy start-up to bolster NI," Jul. 30, 2003, CNet News.com, retrieved May 3, 2006, http://news.zdnet.com/2100-35213_22-5057752.html, 8 pages.
Strand, L., "Adaptive distributed firewall using intrusion detection," Nov. 1, 2004, University of Oslo Department of Informatics, retrieved Mar. 8, 2006, from http://gnist.org/~lars/studies/master/StrandLars-master.pdf, 158 pages.
Van Renesse, R., "Astrolabe: a Robust and Scalable Technology for Distributed System Monitoring, Management, and Data Mining," May 2003, ACM Transactions on Computer Systems (TOCS), 21(2): 164-206, 43 pages.
Vijayan, J., "Terraspring Gives Sun's N1 a Boost," Nov. 25, 2002, Computerworld, retrieved May 3, 2006, from http://www.computerworld.com/printthis/2002/0,4814,76159,00.html, 3 pages.
Virtual Iron Software Home, Virtualiron®, retrieved May 3, 2006, from http://www.virtualiron.com/, 1 page.
Waldspurger, C.A., et al., "Spawn: A Distributed Computational Economy," Feb. 1992, IEEE Transactions on Software Engineering, 18(2):103-117, 15 pages.
"Global Server Load Balancing with Serverlron," Foundry Networks, retrieved Aug. 30, 2007, from http://www.foundrynet.com/pdf/an-global-server-load-bal.pdf, 7 pages.
Abi, Issam, et al., "A Business Driven Management Framework for Utility Computing Environments," Oct. 12, 2004, HP Laboratories Bristol, HPL-2004-171, retrieved Aug. 30, 2007, from http://www.hpl.hp.com/techreports/2004/HPL-2004-171.pdf, 14 pages.
Joseph, Joshy, et al., "Introduction to Grid Computing," Apr. 16, 2004, retrieved Aug. 30, 2007, from http://www.informit.com/articles/printerfriendly.aspx?p=169508, 19 pages.
Zhu, Xiaoyun, et al., "Utility-Driven Workload Management Using Nested Control Design," Mar. 29, 2006, HP Laboratories Palo Alto, HPL-2005-193(R.1), retrieved Aug. 30, 2007, from http://www.hpl.hp.com/techreports/2005/HPL-2005-193R1.pdf, 9 pages.
Byun et al., "A Dynamic Grid Services Deployment Mechanism for on-Demand Resource Provisioning," IEEE International Symposium on Cluster Computing and the Grid:863-870, 2005.
Maesono, et al., "A Local Scheduling Method considering Data Transfer in Data Grid," Technical Report of IEICE, vol. 104, No. 692, pp. 435-440, The Institute of Electronics, Information and Communication Engineers, Japan, Feb. 2005.
Shin'ichiro Takizawa, et al., "Scalable MultiReplication Framework on The Grid," Journal of Information Processing Society of Japan, vol. 2004, No. 81, pp. 247-252, Information Processing Society of Japan, Japan, Aug. 1, 2004.
Watanabe, et al., "Remote Program Shipping System for GridRPC Systems," Journal of Information Processing Society of Japan, vol. 2003, No. 102, pp. 73-78, Information Processing Society of Japan, Japan, Oct. 16, 2003.
Yamagata, et al., "A virtual-machine based fast deployment tool for Grid execution environment," Journal of Information Processing Society of Japan, vol. 2006, No. 20, pp. 127-132, Information Processing Society of Japan, Japan, Feb. 28, 2006.

* cited by examiner

FIG. 3A
Group Membership Table

| Node | Group | ... |
|------|-------|-----|
| A | Group1 | |
| B | Group2 | |
| C | Group2 | |
| D | Group3 | |
| D | Group4 | |
| ... | | |

FIG. 3B
Access Rights Table

| Group Name | Allowed Sender | HTTP | FTP | SMTP | ... |
|------------|----------------|------|-----|------|-----|
| Group1 | 0.0.0.0/0 | Yes | No | No | |
| Group2 | Group1 | Yes | No | No | |
| Group2 | Group3 | Yes | No | Yes | |
| Group2 | 196.25.1.23 | Yes | Yes | Yes | |
| Group3 | Group2 | Yes | No | No | |
| Group3 | 196.25.1.23 | Yes | Yes | Yes | |
| ... | | | | | |

Initial condition (no information)

After B sends to D (HTTP) [allow] (example of allowance)

After D sends to A (SMTP) [deny] (example of denial)

After D sends to B (HTTP) [allow] (e.g. allowance the in other direction)

After A sends to B (FTP) [deny] (example of communication on same host)

After B sends to D (FTP) [deny] (different protocol to previously allowed dest)

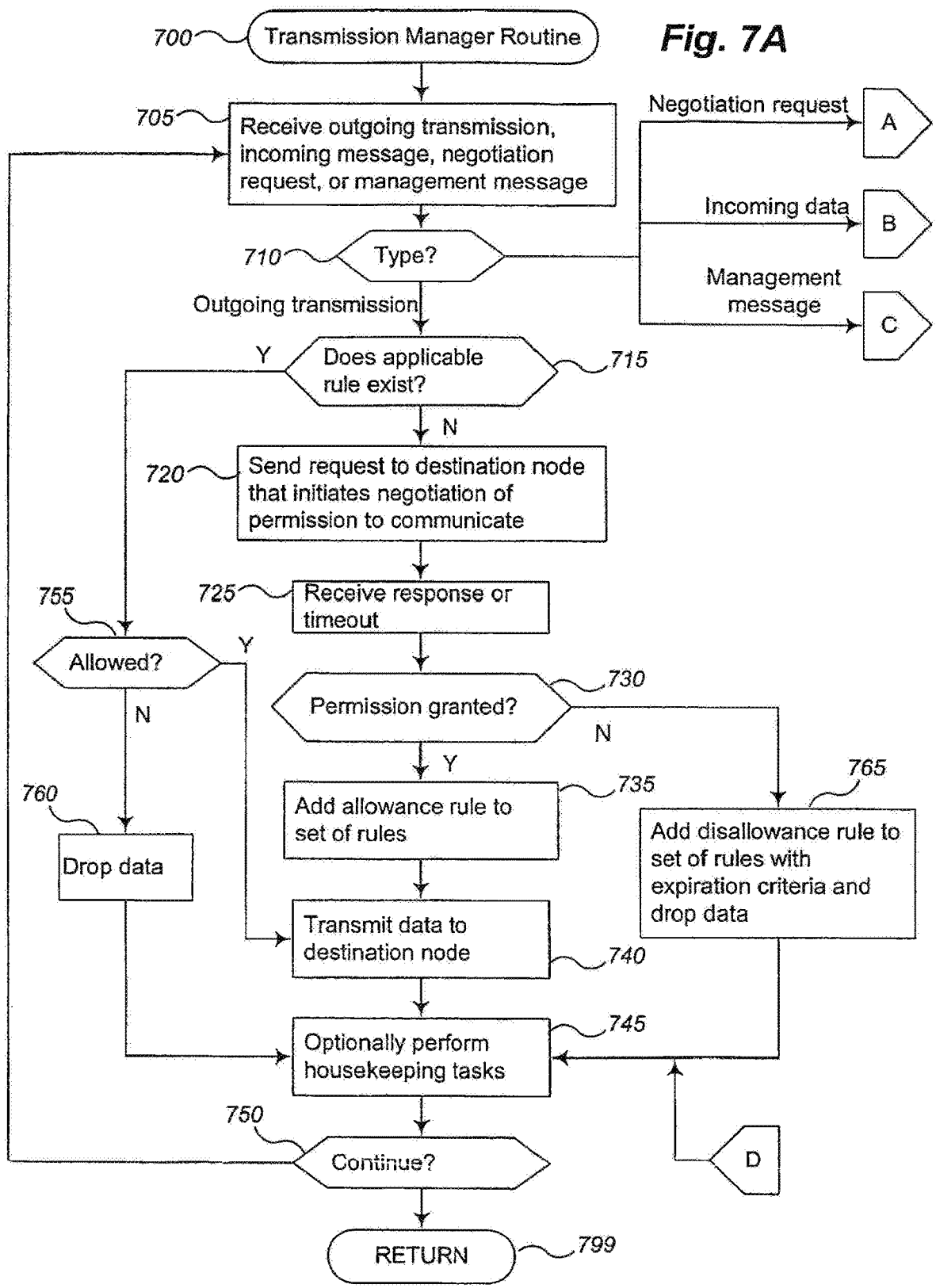

NETWORK-ACCESSIBLE SERVICE FOR EXECUTING VIRTUAL MACHINES USING CLIENT-PROVIDED VIRTUAL MACHINE IMAGES

This application is a continuation of U.S. patent application Ser. No. 16/460,989, filed Jul. 2, 2019, which is a continuation of U.S. patent application Ser. No. 15/479,142, filed Apr. 4, 2017, now U.S. Pat. No. 10,348,770, which is a continuation of U.S. patent application Ser. No. 14/928,659, filed Oct. 30, 2015, now U.S. Pat. No. 9,621,593, which is a continuation of U.S. patent application Ser. No. 13/843,287, filed Mar. 15, 2013, now U.S. Pat. No. 9,253,211, which is a continuation of U.S. patent application Ser. No. 12/859,098, filed Aug. 18, 2018, now U.S. Pat. No. 8,509,231, which is a continuation of U.S. patent application Ser. No. 11/394,595, filed Mar. 31, 2006, now U.S. Pat. No. 7,801,128, which are hereby incorporated by reference herein in their entirety.

TECHNICAL FIELD

The following disclosure relates generally to managing communications between computing nodes, such as to control outgoing transmissions of data to remote destination nodes so as to reflect dynamically determined authorizations for the transmissions.

BACKGROUND

Data centers housing significant numbers of interconnected computing systems have become commonplace, such as private data centers that are operated by and on behalf of a single organization, and public data centers that are operated by entities as businesses that provide access to computing resources to customers under various business models. For example, some public data center operators provide network access, power, and secure installation facilities for hardware owned by various customers, while other public data center operators provide "full service" facilities that also include the actual hardware resources used by their customers. However, as the scale and scope of typical data centers has increased, the task of provisioning, administering, and managing the physical computing resources has become increasingly complicated.

The advent of virtualization technologies for commodity hardware has provided a partial solution to the problem of managing large-scale computing resources for many customers with diverse needs, allowing various computing resources to be efficiently and securely shared between multiple customers. For example, virtualization technologies such as those provided by VMWare, XEN, or User-Mode Linux may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span one or more physical resources, such as a single virtual machine with multiple virtual processors that actually spans multiple distinct physical computing systems.

However, one problem that arises in the context of data centers that virtually or physically host large numbers of applications or systems for a set of diverse customers involves providing network isolation for the systems operated by or on behalf of each customer, such as to allow communications between those systems (if desired by the customer) while restricting undesired communications to those systems from other systems. Traditional firewall technologies may be employed to provide limited benefits, but problems persist. For example, firewalls are typically configured to filter incoming network traffic at or near the destination of the traffic, but this allows malicious applications to cause resource outages by flooding a given network with traffic, even if the firewalls were able to perfectly block all such incoming network traffic. In addition, firewalls do not typically include facilities for dynamically modifying filtering rules to reflect the types of highly dynamic resource provisioning that may occur in the context of a large-scale data center hosting many thousands of virtual machines. Thus, as new applications and systems come online and others go offline, for example, traditional firewalls lack the ability to dynamically determine appropriate filtering rules required to operate correctly, instead necessitating time-consuming and error-prone manual configuration of such filtering rules.

Thus, given such problems, it would be beneficial to provide techniques that allow users to efficiently specify communications policies that are automatically enforced via management of data transmissions for multiple computing nodes, such as for multiple hosted virtual machines operating in one or more data centers or other computing resource facilities.

BRIEF DESCRIPTION OF THE DRAWINGS

FIGS. 3A-3B illustrate examples of using group membership information for managing communications between computing nodes.

FIGS. 7A-7B illustrate a flow diagram of an example embodiment of a Transmission Manager routine.

DETAILED DESCRIPTION

Figure 1:
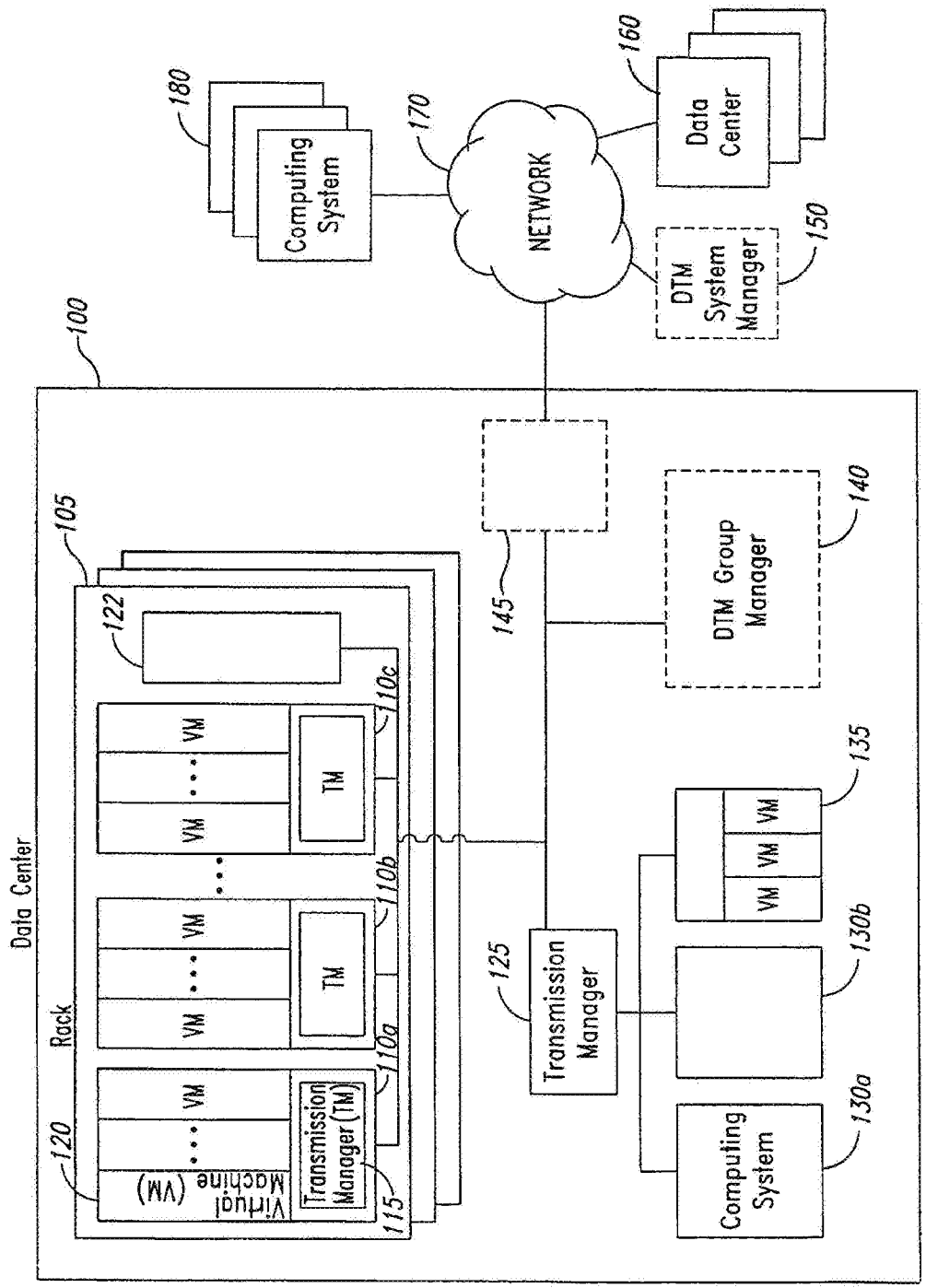
FIG. 1 is a network diagram illustrating an example embodiment in which multiple transmission manager components manage communications between computing nodes.

Techniques are described for managing the execution of programs on multiple computing systems. In some embodiments, described techniques are performed on behalf of a program execution service for executing multiple programs on behalf of multiple users of the service (e.g., customers). In some embodiments, the program execution service may use a variety of factors to select an appropriate computing system to execute an instance of a program, such as the location of one or more previously stored copies of the program from which the selected computing system may acquire a copy of the program to execute and/or of available computing system resources for execution of the program instance. For example, in some embodiments the selection of an appropriate computing system to execute an instance of a program may be based, in part, on determining a computing system that already stores a local copy of the program. In another example, the selection of an appropriate computing system may be based, in part, on determining a computing system that is sufficiently proximate (whether geographically and/or logically) to one or more other computing systems that each store such a local copy, such as one or more other computing systems in a common group with the determined computing system.

In some embodiments, the multiple computing systems available to execute programs may include multiple physical computing machines interconnected via one or more networks or other data exchange mediums that are capable of transmitting data between the computing machines. The multiple computing systems may, for example, be located in a physical location (e.g., a data center) and may be separated into multiple groups, and may be managed by one or more system manager modules responsible for those multiple computing systems as a whole and by multiple machine manager modules that are each associated with one of the groups in order to machine the computing systems of the group. At least some of the computing machines may each include sufficient resources to execute multiple programs simultaneously (e.g., sufficient writeable memory and/or one or more of sufficient storage, CPU cycles or other CPU usage measure, network bandwidth, swap space, etc.). For example, at least some of the computing machines in some such embodiments may each host multiple virtual machine nodes that each may execute one or more programs on behalf of a distinct user. As noted, in at least some embodiments, the multiple computing systems managed by the program execution service may be organized into multiple distinct groups (e.g., with each computing system belonging to a single group), such as based on criteria including physical or logical proximity, or having a common data exchange medium. In one example, the common data exchange medium for a group may be provided by a single network switch and/or rack backplane that provides high bandwidth communications between the computing systems of the group (e.g., with some or all of the computing systems that are connected to the network switch or rack backplane being the members of the group). Each group of computing systems may also be connected to other computing systems (e.g., computing systems of other groups, or remote computing systems that are not managed by the program execution service) by one or more other data exchange mediums (e.g., Ethernet-based wiring, a wireless connection, or other data connections), such as other data exchange mediums with lower bandwidth than the groups' common data exchange mediums. Furthermore, in at least some embodiments some or all of the computing systems may each have local program repositories (e.g., hard disks or other local storage mechanisms) that can be used to store local copies of programs for execution, such as prior to or at the time of execution of the program. Additionally, in at least some embodiments, each group of multiple computing systems may use one or more computing systems of the group to store local copies of programs for use by other computing systems of the group.

In an illustrated embodiment, the program execution service may include a software facility that executes on one or more computing systems in order to manage the execution of the programs. The software facility may include one or more machine manager modules for each group of one or more computing systems that manage the retrieval, storage and execution of programs by the computing systems of that group. For example, a distinct machine manager module may be provided for each distinct physical computing machine, such as with a machine manager module for a physical computing machine being executed on at least one of multiple virtual machines of that computing machine. In addition, in some embodiments the software facility may include one or more system manager modules executing on one or more computing systems that manage retrieval, storage and execution of programs for all of the multiple computing systems being used to execute programs. The system manager modules may interact with machine manager modules as appropriate, as discussed in greater detail below.

In at least some embodiments, the execution of one or more instances of a program on one or more computing systems may be initiated in response to a current execution request for immediate execution of those program instances. Alternatively, the initiation may be based on a previously received program execution request that scheduled or otherwise reserved the then-future execution of those program instances for the now-current time. Program execution requests may be received in various ways, such as directly from a user (e.g., via an interactive console or other GUI provided by the program execution service), or from an executing program of a user that automatically initiates the execution of one or more instances of other programs or of itself (e.g., via an API, or application programming interface, provided by the program execution service, such as an API that uses Web services).

Program execution requests may include various information to be used in the initiation of the execution of one or more instances of a program, such as an indication of a program that was previously registered or otherwise supplied for future execution, and a number of instances of the program that are to be executed simultaneously (e.g., expressed as a single desired number of instances, as a minimum and maximum number of desired instances, etc.). In addition, in some embodiments, program execution requests may include various other types of information, such as the following: an indication of a user account or other indication of a previously registered user (e.g., for use in identifying a previously stored program and/or in determining whether the requested program instance execution is authorized); an indication of a payment source for use in providing payment to the program execution service for the program instance execution; an indication of a prior payment or other authorization for the program instance execution (e.g., a previously purchased subscription valid for an amount of time, for a number of program execution instances, for an amount of resource utilization, etc.); and/or an executable or other copy of a program to be executed immediately and/or stored for later execution. In addition, in some embodiments, program execution requests may further include a variety of other types of preferences and/or requirements for execution of one or more program instances. Such preferences and/or requirements may include indications that some or all of the program instances be executed in an indicated geographical and/or logical location, such as in one of multiple data centers that house multiple computing machines available for use, on multiple computing systems that are proximate to each other, and/or on one or more computing system that are proximate to computing systems executing one or more other indicated program instances (e.g., instances of the same program, or of another program). Such preferences and/or requirements may further include indications that some or all of the program instances each be allocated indicated resources during execution.

After receiving a request to execute one or more instances of a program at an indicated time, the program execution service determines one or more computing systems to use in executing the program instances. In some embodiments, the determination of the computing systems to be used is performed at the time of the request even if for future execution. In other embodiments, the determination of the computing systems to be used for future execution of one or more program instances may be deferred to a later time, such as at the future time of execution based on information that is then available. The determination of which computing system to use for execution of each program instance may be made in a variety of ways, including based on any preferences and/or requirements specified in the program request or otherwise specified for the program and/or associated user (e.g., at a time of prior registration). For example, if criteria are determined for preferred and/or required resources for execution of a program instance, the determination of an appropriate computing system to execute a program instance may be based at least in part on whether a computing system has sufficient resources available to satisfy those resource criteria.

In some embodiments, the program execution service may base the determination of which computing system to utilize to execute the program to be executed on the location of one or more previously stored copies of the program to be executed. In particular, as previously noted, in at least some embodiments, the various computing systems that are available to execute programs may be organized into groups (such as with each computing system belonging to one of multiple groups). Accordingly, the determination of whether a computing system is appropriate to execute an instance of a program may be based, in part, on whether one or more computing systems in that computing system's group store local copies of the program. By selecting a computing system to execute an instance of a program that already has a locally stored copy of the program or that belongs to a group that has one or more locally stored copies, various benefits may be obtained, such as to reduce the program execution startup latency based on obtaining a copy of the program. When a computing system in a group stores a local copy of a program to be executed, the program execution service may nonetheless select one or more other computing systems in the group to currently execute instances of the program for various reasons, such as if the computing system with the locally stored copy does not currently have sufficient resources to execute an instance the program, if the computing system with the locally stored copy already is executing one or more instances of the program, etc.

In a further embodiment, the program execution service may select one or more computing systems to execute instances of the program on various other factors. For example, when a user requests that multiple instances of an indicated program be executed at the same time, the program execution service may prefer to distribute the execution of the program instances among computing systems that are members of different groups, such as to provide enhanced reliability in the face of group-specific network outages or other problems. Similarly, in some embodiments multiple instances of a program may be executed on multiple computing systems rather than a single computing system (even if the single computing system has sufficient resources to execute the multiple instances). Such distribution of program instances may, for example, provide enhanced reliability in the face of failure of a single computing system that would instead execute all of the program instances or of loss of connection to that single computing system. In addition, if the computing systems managed by the program execution service are physically (e.g., geographically) separate, the program execution service may be instructed by a user or otherwise prefer to execute multiple instances of a program on computing systems located within a single data center, such as to provide relatively high network bandwidth for communications between instances of the executing program. Alternatively, the program execution service may be instructed or otherwise prefer to execute the multiple program instances in multiple distinct data centers, such as if the program instances have little or no inter-communications, and/or if the various program instances support a number of distinct end-users or applications that are geographically distributed.

After the program execution service determines one or more computing systems to use in executing the instances of a program, the program execution service may initiate execution of those program instances in various ways. For example, the system manager modules may provide instructions and various other execution information to the selected computing systems. Such other information may include, for example, indications of one or more other computing systems that store or that may store local copies of the program. Other types of information provided to a selected computing system may include an indication regarding how long to execute the program instance, an indication regarding resources to allocate to the program instance, an indication of access rights to provide to the program instance, an indication of any restrictions on how to manage execution of the program instance (e.g., what types of communications, if any, to allow the program instance to send or receive), etc.

After a selected computing system is notified to execute one or more instances of an indicated program, the selected computing system attempts to perform the program instance execution in accordance with any received instructions or other associated information (e.g., predefined preferences or requirements). The program execution notification may in at least some embodiments be received by a machine manager module associated with the selected computing system (e.g., a machine manager module executing on the selected computing system, or a machine manager module executing on behalf of a group to which the selected computing system belongs). In such embodiments, the machine manager module may operate to manage the execution of the program instance. For example, in situations in which a selected computing system does not already store a local copy of an indicated program to be executed, the machine manager module may operate to obtain or otherwise acquire a copy of the program for execution, as well as for optional local storage. The acquisition of a program copy may, for example, include contacting one or more computing or other systems (e.g., data storage systems) that are indicated in the notification or that are otherwise known to at least potentially store local copies of the program in order to request or retrieve a copy of the program. The acquisition of a program copy may be performed in a variety of ways in various embodiments, as discussed in greater detail below, including by receiving a copy of the program along with the received notification to execute the program instance(s). As discussed in greater detail below, the program execution service may take a variety of other actions to manage execution of programs in at least some embodiments.

In another aspect, an API may be provided that allows other programs to programmatically initiate requests to execute program instances, as well as to possibly programmatically perform a variety of other types of administrative, provisioning, and management operations. Such operations include, but are not limited to, the creation of user accounts, the reservation of execution resources, the registration of new programs to be executed, the management of groups and access policies, the monitoring and management of executing program instances, etc. The functions provided by the API may be invoked, for example, by client computing systems and devices on behalf of users, including by program instances executing on computing systems of the program execution service.

For illustrative purposes, some embodiments are described below in which the execution of specific types of programs on specific types of computing systems is managed in specific ways. These examples are provided for illustrative purposes and are simplified for the sake of brevity, and the inventive techniques can be used in a wide variety of other situations, some of which are discussed below, and the techniques are not limited to use with virtual machines, data centers or other specific types of computing systems or computing system arrangements.

Figure 9:
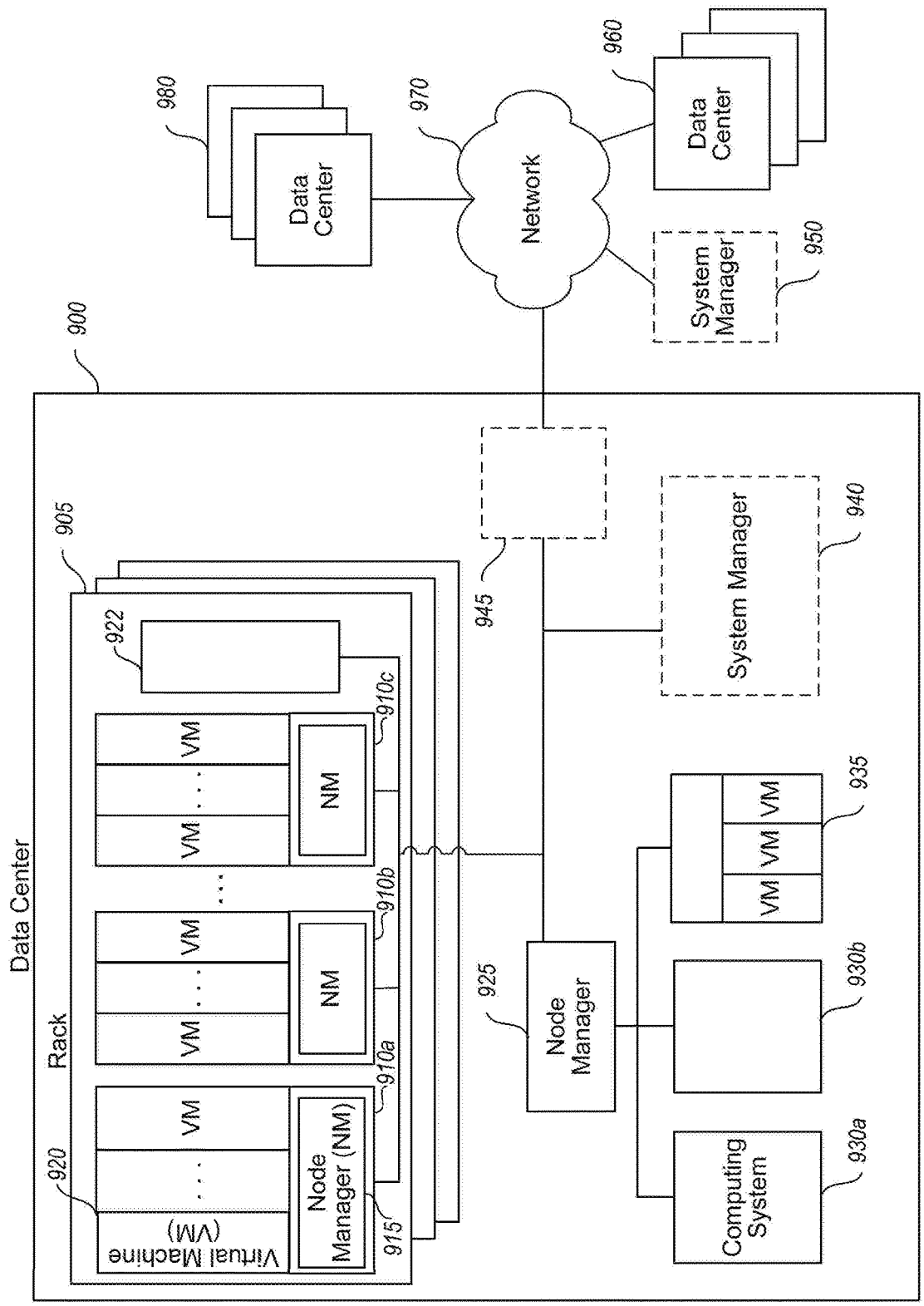
FIG. 9 is a network diagram illustrating an example embodiment in which multiple computing systems exchange and execute programs.

FIG. 9 is a network diagram illustrating an example embodiment in which multiple computing systems exchange and execute programs, such as under the control of a program execution service. In particular, in this example a program execution service manages the execution of programs on various computing systems located within a data center 900. Data center 900 includes a number of racks 905, and each rack includes a number of computing systems 910a-c, as well as a rack support computing system 922 in this example embodiment. The computing systems 910a-c each host one or more virtual machines 920 in this example, as well as a distinct node manager 915 to manage the virtual machines. In this example, each virtual machine 920 may be employed to provide an independent computing environment for executing an instance of program. In this example, the rack support computing system 922 may provide various utility services for other computing systems local to the rack, as well as possibly to other computing systems located in the data center. The utility services may include, for example, data and/or program storage for other computing systems, execution of one or more machine manager modules to support other computing systems, etc. Each computing system 910 may alternatively have a distinct machine manager module (e.g., provided as part of the node manager for the computing system) and/or have local storage (not shown) to store local copies of programs. The computing systems 910a-c and the rack support computing system 922 all share a common data exchange medium in this example, and may all be part of a single group. This common data exchange medium may be connected to one or more external data exchange mediums shared by, for example, other racks or computing systems in the data center 900.

In addition, the example data center 900 further includes additional computing systems 930a-b and 935 that share a common data exchange medium with a node manager 925, and node manager 925 manages computing systems 930a-b and 935. In the illustrated example, computing system 935 also hosts a number of virtual machines as execution environments for use in executing program instances for one or more users, while computing systems 930a-b do not host distinct virtual machines. In this example, an optional computing system 945 resides at the interconnect between the data center 900 and an external network 970. The optional computing system 945 may provide a number of services such as to act as a network proxy, to manage incoming and/or outgoing data transmissions, etc. Additionally, an optional system manager computing system 940 is also illustrated to assist in managing the execution of programs on other computing systems located within the data center (or optionally on computing systems located in one or more other data centers 960). The optional system manager computing system 940 may execute a system manager module. As previously noted, a system manager module may provide a variety of services in addition to managing execution of programs, including the management of user accounts (e.g., creation, deletion, billing, etc.); the registration, storage, and distribution of programs to be executed; the collection and processing of performance and auditing data related to the execution of programs; the obtaining of payment from customers or other users for the execution of programs; etc.

In this example, the data center 900 is connected to a number of other systems via a network 970 (e.g., the Internet), including additional computing systems 980 that may be operated by the operator of the data center 900 or third parties, additional data centers 960 that also may be operated by the operator of the data center 900 or third parties, and an optional system manager 950. In a manner similar to system manager 940, the system manager 950 may manage the execution of programs on computing systems located in one or more data centers 900 and/or 960, in addition to providing a variety of other services. Although the example system manager 950 is depicted as external to any particular data center, in other embodiments it may be located within a data center, such as one of the data centers 960.

Figure 10:
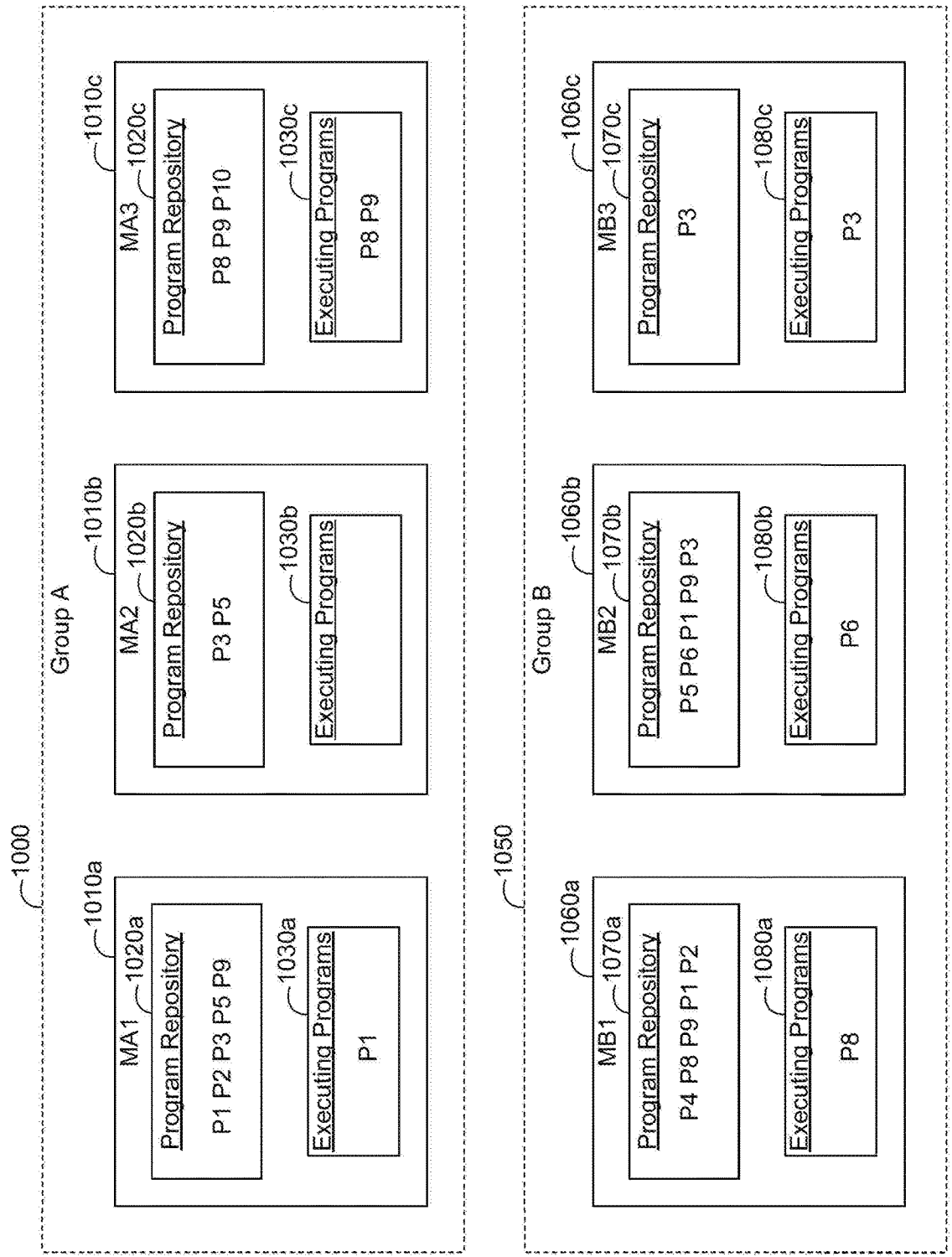
FIG. 10 illustrates an example of groups of computing systems that store and exchange copies of programs.

FIG. 10 illustrates an example of two groups of computing systems that store and exchange copies of programs, such as on behalf of a program execution service. It will be appreciated that in actual embodiments the number of groups, computing systems and programs may be much larger than the groups depicted in FIG. 10. For example, as one illustrative embodiment, there may be 40 computing systems per group and 100 groups per data center, resulting in 4000 computing systems per data center, and each computing system may host 15 virtual machines to execute program instances of customers. Further, if each group includes a dedicated computing system with 2 terabytes of storage, two thousand 1-gigabyte virtual machine image program copies may be stored per group, for a total of 2 million copies per data center. Alternatively, if each of the 40 computing systems per group has 100 gigabytes of local storage, four thousand 1-gigabyte virtual machine image program copies may be stored per group, for a total of 4 million copies per data center. If each hosted virtual machine executes one program, then such a data center may execute as many as sixty thousand program instances at one time. It will be appreciated that in other embodiments other numbers of groups, computing systems and programs may be used, and that programs of much smaller size and/or variable sizes may be stored and executed.

In this example, FIG. 10 depicts two groups, Group A 1000 and Group B 1050. Group A includes three computing machines 1010a-c named MA1, MA2, and MA3, respectively. Group B 1050 similarly includes three computing machines 1060a-c named MB1, MB2, and MB3. Each group may instead have differing numbers of computing machines of differing types, and in some embodiments a computing machine may be a member of multiple groups or of no group. As described in more detail elsewhere, the computing machines of each group share a common data exchange medium for that group (not shown).

In an illustrative example, each computing machine of FIG. 10 may execute one or more program instances, and may store one or more local program copies in local a program repository (e.g., as part of persistent storage provided by, for example, a hard disk or other storage device). For example, computing machine MA1 has local copies of programs P1, P2, P3, P5, and P9 stored in its program repository 1020a, and is currently executing an instance of program P1 as shown in box 1030a. In this example, the program repository on each computing machine is limited in storage capacity to a maximum of five program copies, and each computing system is limited in execution resources to a maximum of two program instances executing simultaneously. The limits on the sizes of the program repositories and the number of executing programs employed in this example are for illustrative purposes only, and in other embodiments each computing system may further have distinct resources. Furthermore, while the size of the program repository may in many embodiments be one or more orders of magnitude larger than the size of memory available for use in executing program instances, this need not necessarily be the case. In other embodiments the maximum number of simultaneously executing program instances may be higher, lower, or the same as the number of programs copies that may be locally stored in the program repository. Accordingly, at least some computing machines or other systems may instead provide only one of a local program repository and available resources to execute program instances. Finally, as will be described in greater detail elsewhere, in some embodiments local stored copies of at least some of the programs may be evicted or otherwise removed from storage under certain circumstances, such as to make room for other program copies after a program repository has reached its capacity. In some embodiments executing instances of at least some of the programs may be terminated or otherwise removed from execution under certain circumstances, such as to make room for other executing program instances after program execution resources have reached their capacity.

A number of example scenarios are presented here for illustrative purposes to provide examples of some types of operation of one embodiment of the program execution service. The program execution service may use one or more specified, predefined and/or learned policies to affect the placement of executing program instances on computing machines, with a simplified set of policies used in this example, as follows. First, multiple instances of a program will be executed on computing machines of more than one group if possible. Second, multiple instances of a program will be executed on more than one computing machine if possible. Third, an instance of a program will be executed on a computing machine that has already stored a copy of the program in its program repository if possible. Fourth, an instance of a program will be executed on a computing machine that is a member of a group that has at least one computing machine that has a stored local copy of the program in its program repository if possible. Finally, an instance of a program will be executed on a computing machine with the highest execution resource availability if possible.

Beginning the illustrative examples of managing program execution for these six computing systems, suppose that a client of the program execution service has requested the execution of two instances of program P7. In this case, given the policies described above, the example embodiment of the program execution service will likely opt to execute one instance of P7 in Group A and one instance in Group B, because such placement tends to distribute the copies over more than one group. As between the computing machines of Group A, since none of the computing machines of the group store a local copy of the program, the program execution service will likely opt not to execute a copy of P7 on computing machine MA3 since it is already executing two programs (P8 and P9). As between computing machines MA1 and MA2, MA2 will be chosen for execution because it is currently not executing any programs. In the illustrated embodiment, machine MA2 will acquire a copy of program P7 for execution and optionally for local storage in repository 1020b from one or more computing systems external to Group A. For example, machine MA2 may acquire the copy of program P7 from a remote program repository for all of the computing machines of the program execution service and/or from a location external to the program execution service. As for the computing machines of Group B, the program execution service may select any of the three computing machines to execute the P7 program instance, since none of the computing systems store a local copy of the program, and each of the computing machines is executing one program.

However, the program execution service may select machine MB3 because it currently only stores one program copy in its program repository. Accordingly, machine MB3 can store a local copy of program P7 if so desired without needing to evict a stored program copy from its program repository.

Next, starting again with the initial conditions shown in FIG. 10, suppose that a client of the program execution service has requested the execution of two instances of program P6. In this case, given the policies described above, the example embodiment of the program execution service will again likely opt to execute one instance of P6 in group A and one instance of P6 in group B, because such placement will distribute instances over more than one group. As between the computing machines of Group A, computing machine MA2 will likely be selected again because none of the computing systems store a local copy of program P6, and computing machine MA2 is the least busy. As amongst the equally busy computing machines of Group B, computing machine MB2 may not be selected because of the policy preferring to distribute copies of a single program over multiple computing machines within a group, despite the fact that only MB2 stores a local copy of the program. Note, however, that other embodiments with different policies that reflect valuing efficiency over reliability may in fact select to execute P6 on computing machine MB2 precisely because a copy of P6 is already stored in the program repository of MB2. As between the remaining candidate computing machines MB3 and MB1, the program execution service may again prefer machine MB3 because there is no need to potentially evict any copies of programs from the MB3 program repository. Accordingly, machine MB3 will, in this embodiment, acquire a copy of program P6 from MB2 for execution and for possible storage in local repository 1070c.

Next, starting again with the initial conditions shown in FIG. 10, suppose that a client of the program execution service has requested the execution of one instance of program P4. In this case, given the policies described above, the example embodiment of the program execution service will likely opt to execute P4 on computing machine MB1. In particular, since there are no instances of P4 already executing and only one instance was requested to be executed, the policies preferring to distribute program instances among multiple groups and preferring to avoid placing multiple executing instances of a program on a single computing machine do not apply. Therefore, since MB1 has already stored a local copy of program P4 in its program repository, MB1 will likely be chosen to execute P4.

Next, starting again with the initial conditions shown in FIG. 10, suppose that a client of the program execution service has requested the execution of one instance of program P10. In this case, given the policies described above, the example embodiment of the program execution service will likely opt to execute P10 on MA2. As with the prior example, the policies preferring to distribute instances of programs for execution among multiple groups and avoiding placing multiple instances of a program on a single computing machine do not apply. And while computing machine MA3 is an attractive candidate because it has already stored a copy of P10 in its repository, it does not have the capacity to currently execute P10 because it is already at its limit of two executing programs (P8 and P9). That leaves computing machines MA1 and MA2 as preferable to any computing machines in Group B, because MA1 and MA2 are in the same group as a computing machine (MA3) that has a stored local copy of program P10 in its repository. As between MA1 and MA2, MA2 will likely be selected because it is the least busy, and it will acquire a copy of program P10 from MA3.

Next, starting again with the initial conditions shown in FIG. 10, suppose that a client of the example embodiment of the program execution service has requested the execution of 6 additional instances of program P3. In this case, given the policies described above, the program execution service will likely execute two instances on computing machine MA2 and one instance on each of computing machines MA1, MB1, MB2, and MB3. No instances will likely be executed on computing machine MA3 because that computing machine is already at its limit of two executing programs (P8 and P9). Note that in this case, some embodiments could evict stored local copies of programs from those computing machines with program repositories without excess capacity in order to store a local copy of program P3. For example, in embodiments that choose to always store a copy of the program to be executed in the local program repository prior to execution, computing machines MA1 and MB1 could evict one local program copy from their respective program repositories. Note also that in this case computing machines MA2 and MB3 will likely each end up executing two instances of P3, counter to the policy preferring to distribute multiple instances of executing programs among multiple computing machines. However, because there are no additional computing machines for executing P3 program instances in the given example, the program execution service would choose to execute multiple instances of P3 on a single computing machine if the request is to be satisfied. Alternatively, in some embodiments, the program execution service may apply different weights to the policies such that the program execution service may instead opt to execute less than the requested number of instances, such as to execute a single instance on each of the computing machines MA1, MA2, MB1, and MB3. Similarly, in some embodiments if more than six additional instances are requested of program P3 and the program and/or requester are of sufficiently high priority, the program execution service may instead opt to execute additional instances of P3, such as by terminating execution of another program instance (e.g., instances of programs P8 and/or P9 on MA3) and/or by reserving the next available program instance execution for P3 after one of the currently executing program instances terminates naturally.

In continued reference to the current example, computing machine MB1 has multiple available sources to acquire a copy of program P3 for execution, since both MB2 and MB3 from Group B store local copies of the program, as do computing machines MA1 and MA2 of Group A In this embodiment, MB1 will request that both MB2 and MB3 of its own group provide a portion of program P3 (e.g., the first X bytes and the second X bytes, where X is a number selected by the program execution service). Machine MB1 will then monitor how rapidly the responses are received from the computing machines, and will request the more responsive computing machine to provide at least the majority (and possibly all) of the remaining portions of the program. In other embodiments the acquisition of a copy of program P3 for computing machine MB1 may be performed in other manners, such as by requesting the program copy from only one of computing machines MB2 and MB3, by requesting at least portions of the program copy from computing machines MA1 and/or MA2 in Group A (whether in addition to or instead of from MB2 and MB3 of Group B), etc.

Figure 11:
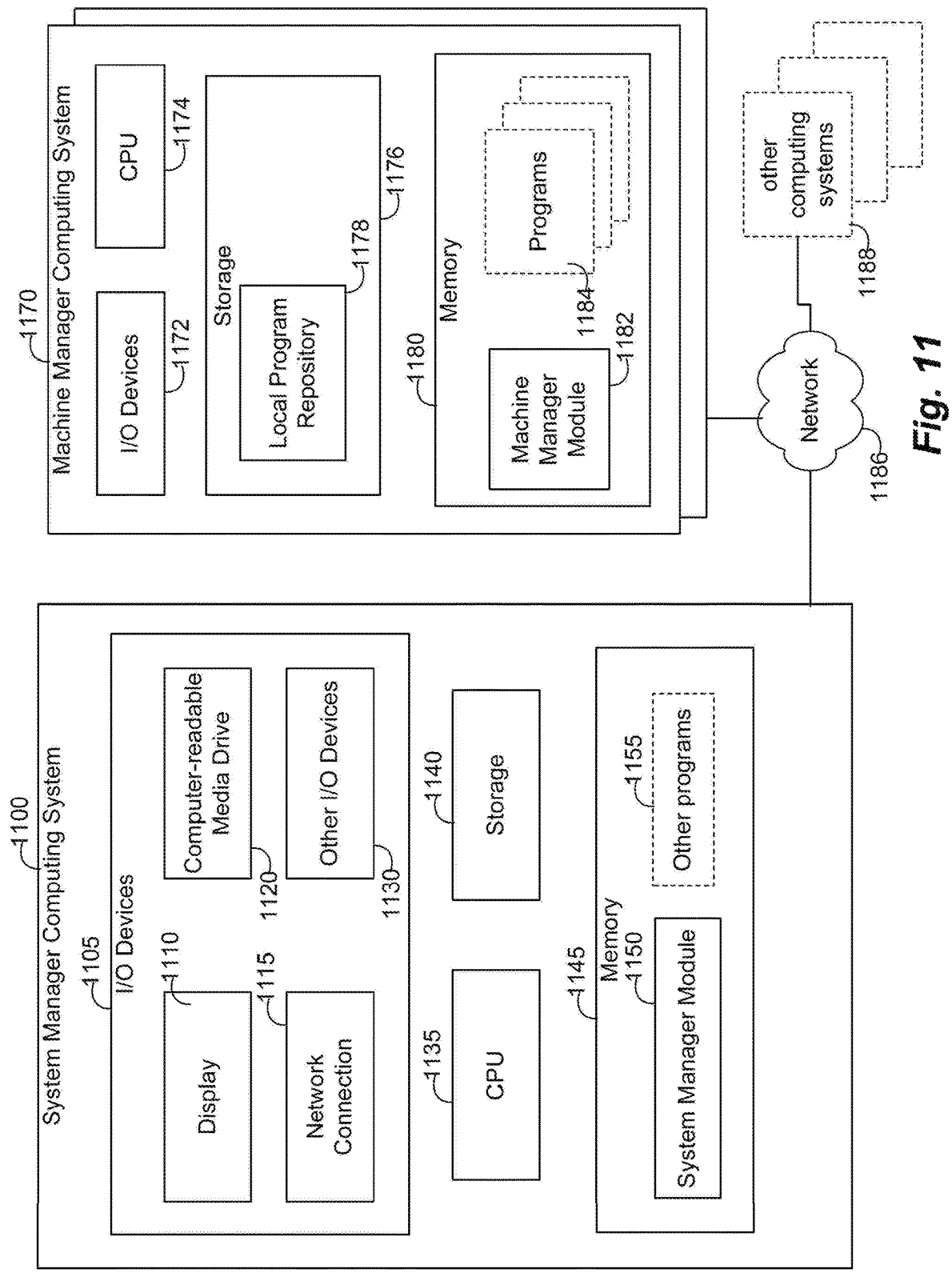
FIG. 11 is a block diagram illustrating example computing systems suitable for managing the execution of programs on multiple computing systems.

FIG. 11 is a block diagram illustrating example computing systems suitable for managing the execution of programs on multiple computing systems being managed, such as by executing an embodiment of a program execution service system. In this example, a computing system 1100 executes an embodiment of a system manager module to coordinate execution of programs on the multiple computing systems that are being managed. In some embodiments, the computing system 1100 may correspond to the system manager 940 or 950 of FIG. 9. Additionally, one or more machine manager computing systems 1170 each execute a machine manager module 1182 to facilitate acquisition and execution of programs by one or more associated computing systems. In some embodiments, each of the one or more machine manager modules may correspond to one of the node managers 915 or 925 of FIG. 9. In this example, multiple machine manager computing systems are provided and each act as one of the multiple computing systems of the program execution service that are being managed by the system manager module. In an illustrated example, a distinct machine manager module executes on each of the computing systems 1170. In other embodiments, the machine manager module on each of the machine manager computing systems could instead manage one or more other computing systems (e.g., other computing systems 1188).

In this example embodiment, computing system 1100 includes a central processing unit ("CPU") 1135, storage 1140, memory 1145, and various input/output ("1/0") devices 1105, with the illustrated I/O devices including a display 1110, a network connection 1115, a computer-readable media drive 1120, and other I/O devices 1130. Other I/O devices that are not illustrated may include keyboards, mice or other pointing devices, microphones, speakers, etc. In the illustrated embodiment, a system manager module 1150 is executing in memory 1145 in order to manage the execution of programs on other computing systems, and one or more other programs 1155 may also optionally be executing in memory 1145. Computing system 1100 and computing system(s) 1170 are connected to each other as well as other computing systems 1188 via a network 1186.

Each computing system 1170 similarly includes a CPU 1174, various I/O devices 1172, storage 1176, and memory 1180. In the illustrated embodiment, a machine manager module 1182 is executing in memory 1180 in order to manage the execution of one or more other programs 1184 on the computing system for the program execution service, such as on behalf of customers of the program execution service. In some embodiments, some or all of the computing systems 1170 may host multiple virtual machines. If so, each of the executing programs 1184 may be an entire virtual machine image (e.g., with an operating system and one or more application programs) executing on a distinct hosted virtual machine. The machine manager module may similarly be executing on another hosted virtual machine, such as a privileged virtual machine that is able to monitor the other hosted virtual machines. In other embodiments, the executing program instances 1184 and the machine manager module 1182 may execute as distinct processes on a single operating system (not shown) executed on computing system 1170. Thus, in this example embodiment, the capabilities of the program execution service are provided by the interactions of system manager 1150 and the machine manager modules 1182 that communicate via network 1186 to jointly manage the distribution, acquisition and execution of programs on the computing systems being managed.

It will be appreciated that computing systems such as computing systems 1100 and 1170 are merely illustrative and are not intended to limit the scope of the present invention. Computing systems 1100 and 1170 may be connected to other devices that are not illustrated, including network accessible database systems or other data storage devices. More generally, a computing machine or computing system or data storage system may comprise any combination of hardware or software that can interact and perform the described types of functionality, including without limitation desktop or other computers, database servers, network storage devices and other network devices, PDAs, cellphones, wireless phones, pagers, electronic organizers, Internet appliances, television-based systems (e.g., using set-top boxes and/or personal/digital video recorders), and various other consumer products that include appropriate inter-communication capabilities. In addition, the functionality provided by the illustrated system modules may in some embodiments be combined in fewer modules or distributed in additional modules. Similarly, in some embodiments the functionality of some of the illustrated modules may not be provided and/or other additional functionality may be available.

It will also be appreciated that, while various items are illustrated as being stored in memory or on storage while being used, these items or portions of them can be transferred between memory and other storage devices for purposes of memory management and data integrity. Alternatively, in other embodiments some or all of the software components and/or modules may execute in memory on another device and communicate with the illustrated computing systems via inter-computer communication. Some or all of the system modules or data structures may also be stored (e.g., as software instructions or structured data) on a computer-readable medium, such as a hard disk, a memory, a network, or a portable media article to be read by an appropriate drive or via an appropriate connection. The system modules and data structures can also be transmitted as generated data signals (e.g., as part of a carrier wave or other analog or digital propagated signal) on a variety of computer-readable transmission mediums, including wireless-based and wired/cable-based mediums, and can take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 12A:
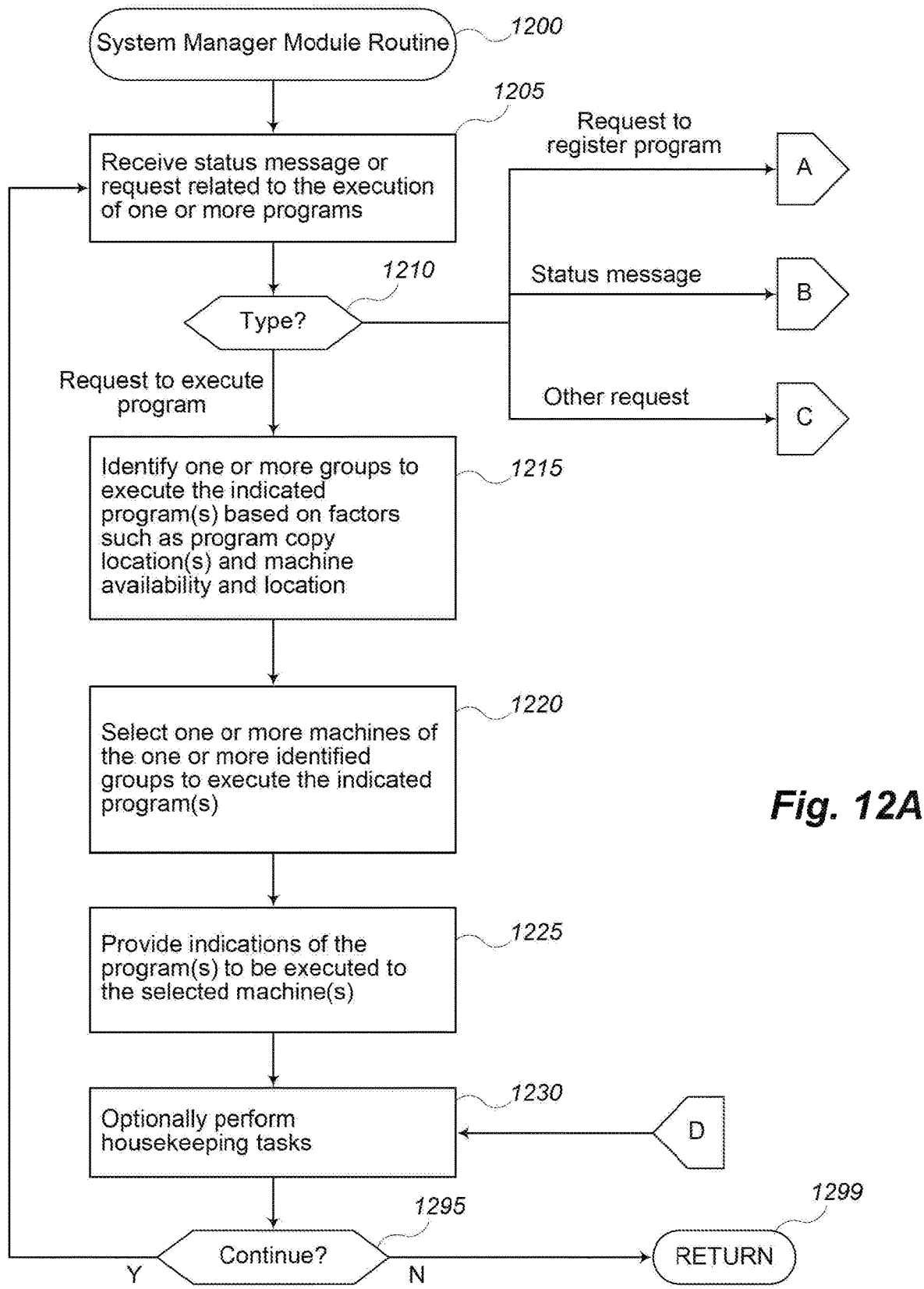
FIGS. 12A-12B illustrate a flow diagram of an embodiment of a system manager module routine.
Figure 12B:
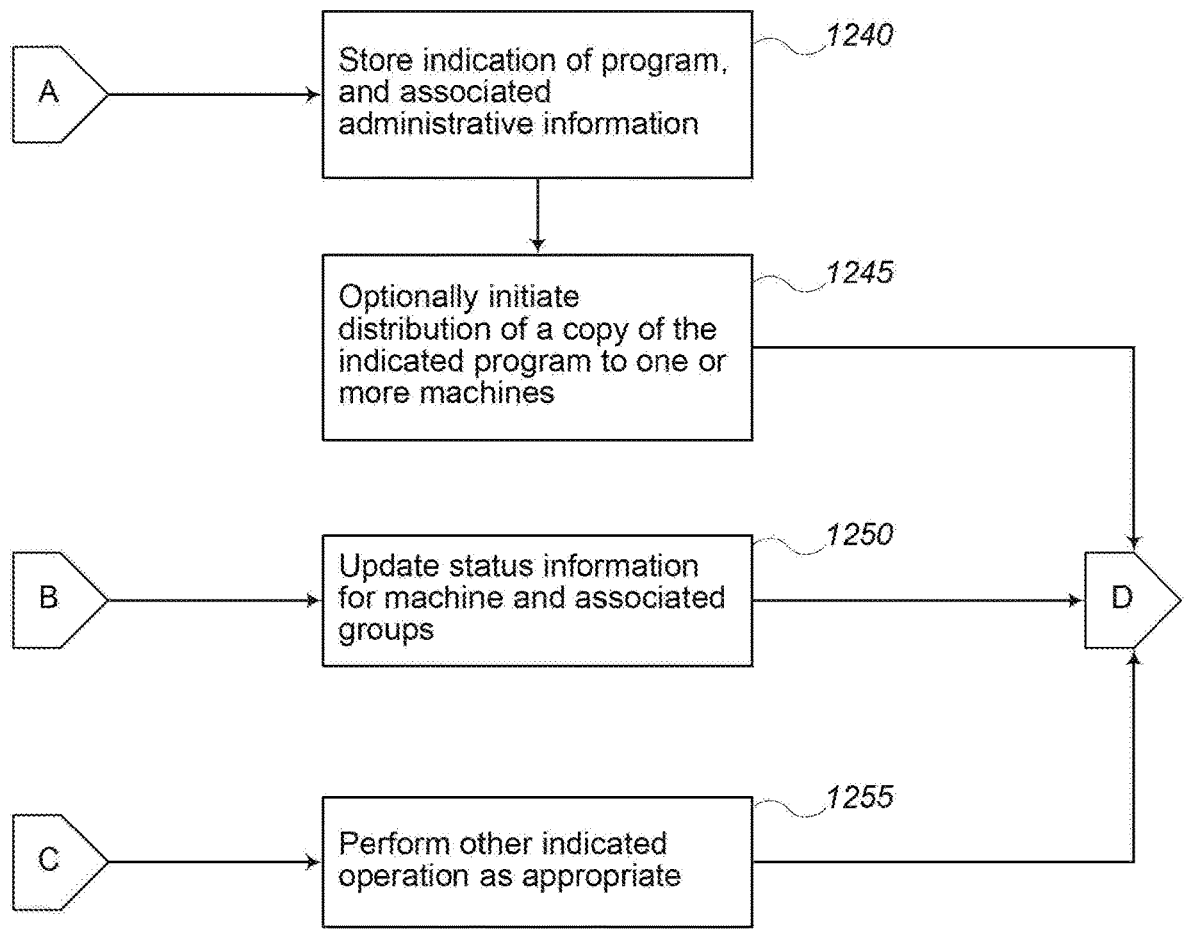

FIGS. 12A-12B illustrate a flow diagram of an embodiment of a system manager module routine 1200. This routine may be provided by, for example, execution of the system manager module 940 of FIG. 9 and/or the system manager module 1150 of FIG. 11, such as to manage execution of multiple programs on multiple computing systems on behalf of a program execution service.

The routine begins in step 1205 and receives a status message or a request related to the execution of one or more programs. The routine then proceeds to step 1210 and determines the type of the received message or request. If it is determined that a request to execute one or more instances of one or more indicated programs has been received, the routine proceeds to step 1215. In step 1215, the routine identifies one or more groups of computing systems to execute the indicated program(s). In step 1220, the routine selects one or more computing systems in each of the one or more identified groups to execute instances of the indicated program(s). The selection of the one or more groups may be based on various factors, such as whether a group has one or more computing systems that store one or more local copies of the program(s), the availability of appropriate computing resources, and locations of the computing systems of the groups. The selection of one or more computing systems in an identified group may similarly be based on various factors, such as the location(s) of stored local copies of the program(s) among computing systems of the group and computing resource availability. As previously noted, various specified policies and other criteria may be used as part of the selection of groups and computing systems in various embodiments, including criteria specified by a user or other requester. In addition, in other embodiments groups and particular computing systems may not be individually selected, such as to merely pick the most appropriate one or more computing systems regardless of groups (e.g., if no groups are used).

Next, at step 1225, the routine provides an indication of the program(s) to be executed to the selected computing system(s) and/or to one or more machine manager modules associated with those computing systems, such as by sending a message that includes instructions to execute those program instances. In the illustrated embodiment, a distinct machine manager module executes on each of the computing systems, and is the receipt of the message. As previously noted, a variety of types of information may be provided to the machine manager modules, including indications of how to identify one or more computing systems from which to acquire a copy of the program to be executed. Alternatively, in some embodiments the system manager may directly provide a copy of an indicated program to a computing system and/or initiate the execution of a program on a computing system without the intervention of a machine manager module or other additional module.

If it was instead determined in step 1210 that a request to register a new program was received, such as from a user, the routine proceeds to step 1240 and stores an indication of the program and any associated administrative information, such as the identity of the user who registered the program. Next, in step 1245, the routine optionally initiates distribution of a copy of the indicated program to one or more computing systems. For example, in some embodiments the system manager may elect to seed one or more computing systems and/or program repositories in one or more data centers with stored local copies of the indicated program in order to improve the efficiency of later program execution initiation.

If it was instead determined in step 1210 that a status message was received to reflect the operations of one or more of the managed computing systems, the routine proceeds to step 1250 and updates status information for the one or more computing systems. For example, the machine manager module may determine that an associated computing system has modified the program instances being executed and/or the local program copies being stored, and may accordingly provide a status message to the system manage. In some embodiments, status messages will be sent periodically by machine manager modules in order to keep the system managers informed as to the operational status of the managed computing systems for use in the selection of appropriate computing systems to execute programs. In other embodiments, status messages may be sent at other times (e.g., whenever a relevant change occurs). In other embodiments, the system manager module may instead request information from machine manager modules as desired. Status messages may include a variety of types of information, such as the number and identity of programs currently executing on a particular computing system, the number and identity of copies of programs currently stored in the local program repository on a particular computing system, performance-related and resource-related information (e.g., utilization of CPU, network, disk, memory, etc.) for a computing system, configuration information for a computing system, and reports of error or failure conditions related to hardware or software on a particular computing system.

If it was instead determined in step 1210 that any other type of request was received, the routine proceeds to step 1255 and performs other indicated operations as appropriate. Such operations may include, for example, responding to status queries from other components in the system, suspending or terminating the execution of one or more currently executing programs, migrating currently executing programs from one computing system to another, shutting down or restarting the system manager, etc.

After steps 1225, 1245, 1250, and 1255, the routine proceeds to step 1230 and optionally performs any housekeeping tasks, such as calculating billing information for users, updating display information, sending periodic queries to node managers or other components, rotating logs or other information, etc. Next, the routine proceeds to step 1295 and determines whether to continue. If so, the routine returns to step 1205, and if not proceeds to step 1299 and returns.

Figure 13:
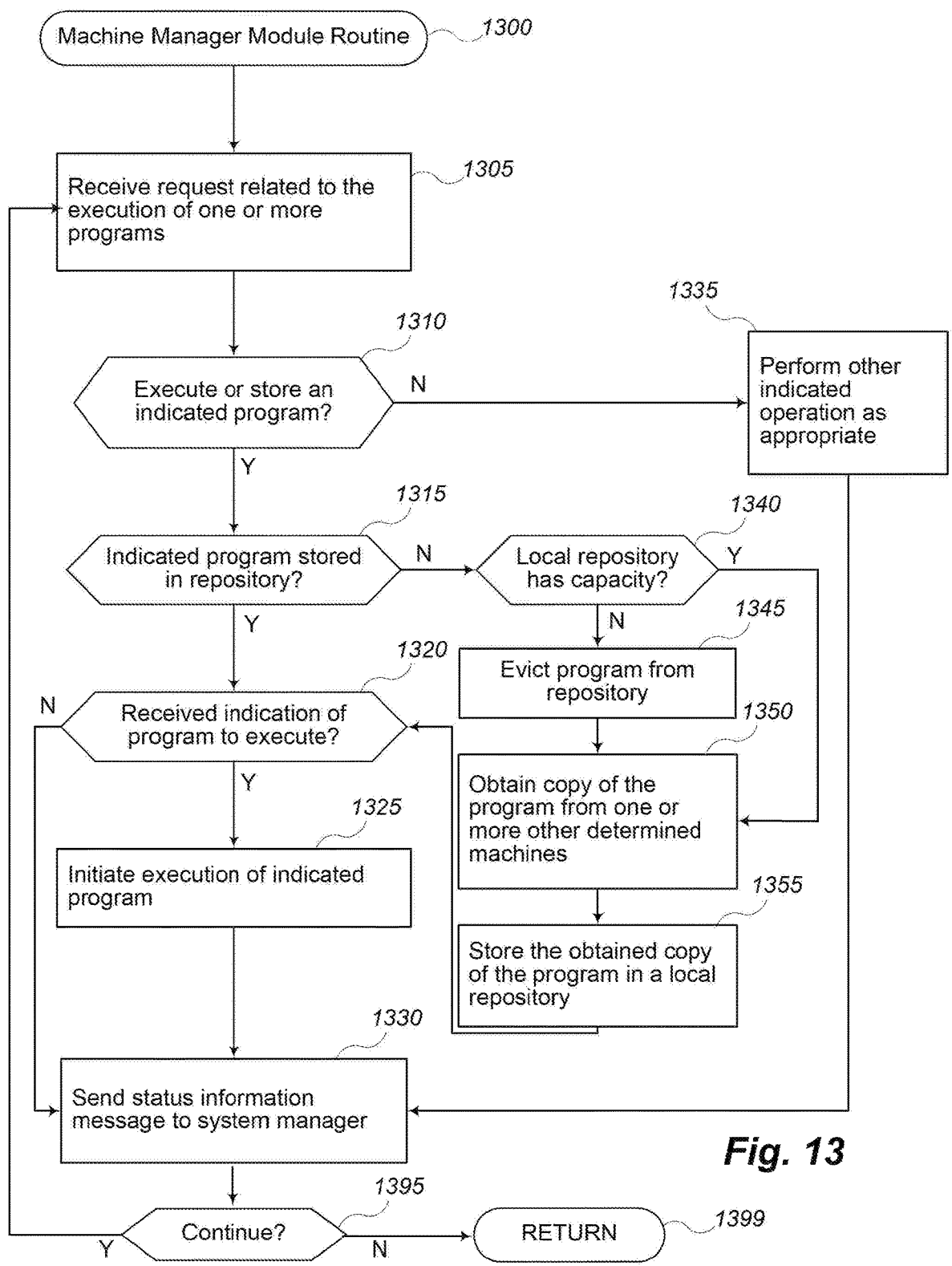
FIG. 13 illustrates a flow diagram of an embodiment of a machine manager module routine.

FIG. 13 illustrates a flow diagram of a machine manager module routine 1300. The routine may be provided by, for example, execution of a machine manager module 1182 of FIG. 11 and/or a node manager 915 or 925 of FIG. 9, such as to facilitate acquisition of program copies and execution of program instances for one or more associated computing systems being managed. In the illustrated embodiment, each machine manager module routine executes on behalf of a single computing system that is configured to both execute one or more program instances and to store one or more local program copies, with the machine manager module operating in concert with the system manager module routine described with respect to FIGS. 12A-B to manage the execution of programs for the managed computing systems for the program execution service.

The routine begins in step 1305 and receives a request related to the execution of one or more programs, such as from the system manager module. The routine proceeds to step 1310 to determine whether a request to execute or store an indicated program was received. If so, the routine proceeds to step 1315 to determine whether the indicated program is currently stored in the local program repository of the computing system being managed. If not, the routine continues to step 1340 to determine whether the local program repository has sufficient capacity to store the indicated program. If not, the routine continues to step 1345 and evicts one or more programs from the local program repository, such as is indicated in the request received in step 1305 or otherwise based on an eviction policy used by the machine manager module. After step 1345, or if it was instead determined in step 1340 that the local program repository did have sufficient capacity to store a local copy of the indicated program, the routine proceeds to step 1350 and acquires a copy of the indicated program from one or more determined other computing systems. The routine may determine other computing systems that have a stored local copy of the program in various ways, including based on information received as part of the request received in step 1305. Additionally, using one or more other techniques such as broadcasts to neighboring computing systems, requests to central directories, and/or peer-to-peer data exchanges may also be used. In other embodiments, the copy of the program may instead be provided along with the request in step 1305. Next, the routine proceeds to step 1355 and stores the obtained copy of the indicated program in the local program repository. After step 1355, or if it was instead determined in step 1315 that the indicated program was already stored in the repository, the routine proceeds to step 1320 to determine whether an indication of a program to be executed was received. If so, the routine proceeds to step 1325 and initiates execution of the indicated program.

If it was instead determined in step 1310 that a request to store or execute a program was not received, the routine proceeds to step 1335 and performs other indicated operations as appropriate. For example, other operations may include suspending or terminating execution of one or more programs, such as in response to a received request and/or based upon information gathered regarding the performance of the program, such as that the program was behaving erratically or excessively utilizing resources. Additionally, other operations may include responding to requests for status information regarding currently executing programs or the contents of the local program repository, etc.

After steps 1335, 1325, or if it was instead determined in step 1320 that an indication of a program to execute was not received, the routine proceeds to step 1330 and sends a status information message to one or more system manager modules. In the illustrated embodiment, the routine sends a status information message to the system manager module after every operation in order to keep the system manager apprised of the state of the computing system managed by the node manager. In other embodiments, the status information may be sent at other times and in other manners. After step 1330, the routine proceeds to step 1395 and determines whether to continue. If so, the routine returns to step 1305, and if not proceeds to step 1399 and returns. While not illustrated here, the routine may also perform various housekeeping operations at various times as needed.

Figure 14:
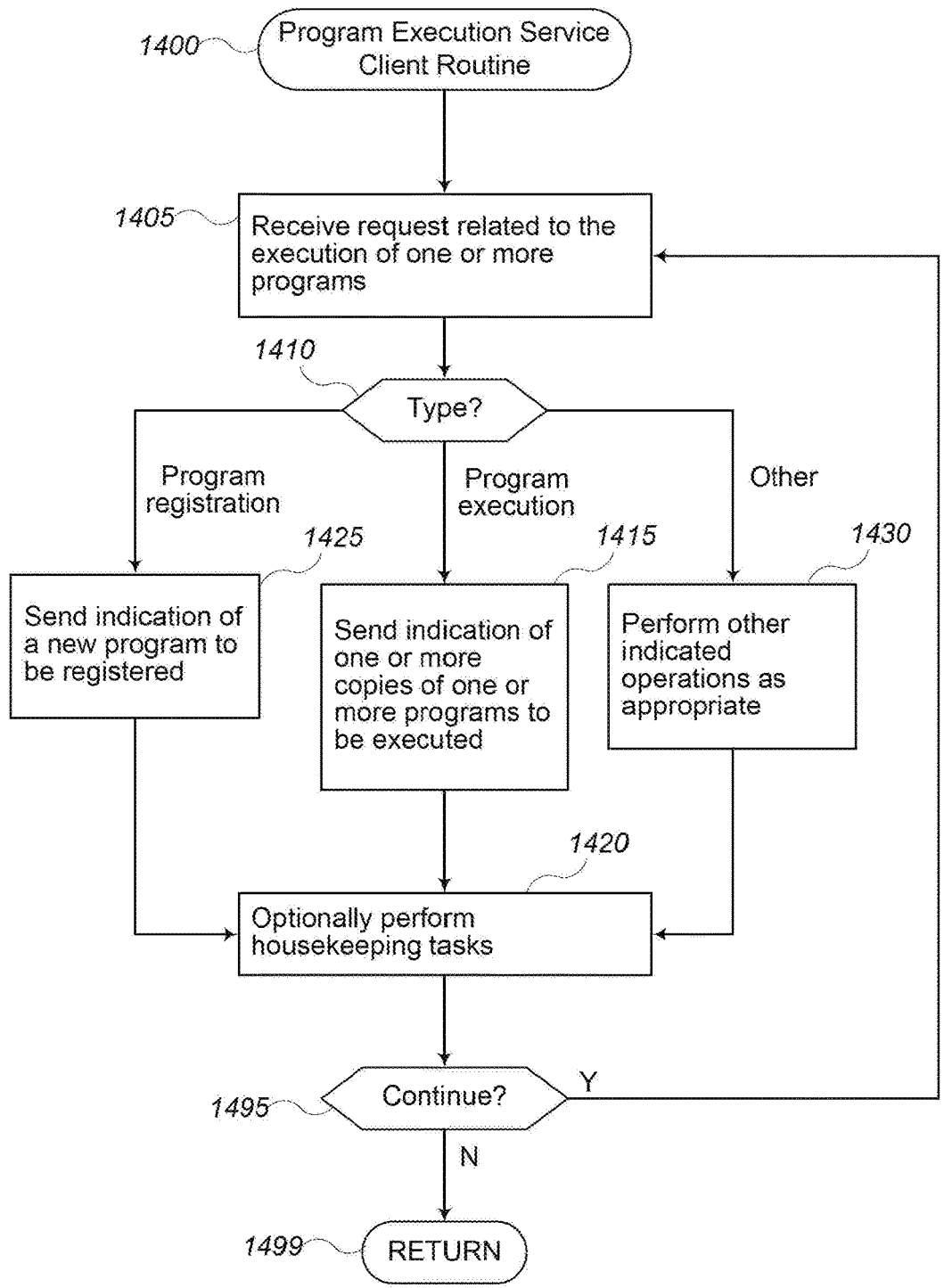
FIG. 14 illustrates a flow diagram of an embodiment of a program execution service client routine.

FIG. 14 illustrates a flow diagram of an embodiment of a program execution service client routine. The routine may, for example, be provided by an application resident on one of the computing systems 980 shown in FIG. 9, such as to provide an interactive console to allow a human user to interact with the program execution service. The routine may alternatively reflect capabilities that are provided by the program execution service interactively to users and/or programmatically to programs of users. Alternatively, this routine may be part of one of the programs that is being executed by the program execution service on one of the managed computing systems, such as to allow such programs to dynamically execute additional program instances for purposes such as load balancing, meeting increased or decreased demand, etc.

The routine begins in step 1405 and receives a request related to the execution of one or more programs. In step 1410, the routine determines the type of the received message. If the request is related to registration of a new program (or a new version of a previously registered program), the routine proceeds to step 1425 and sends an indication of a new program to be registered to the program execution service (e.g., to a system manager module). The indication may include a copy of the program or an instruction of how to obtain the program. If the request is instead determined in step 1410 to be related to the execution of a program, the routine proceeds to step 1415 to send a request to the program execution service (e.g., to a system manager module) to execute one or more instances of a program to be executed. For example, the routine may use an indication previously received from the program execution service to identify the program and/or the user on whose behalf the program instance(s) will be executed. If it is instead determined in step 1410 that some other type of request was received, the routine proceeds to step 1425 and performs other indicated operations as appropriate. For example, the routine may send a request to the program execution service to reserve computing resources at a future time to execute one or more indicated program instances, send a status query to the program execution service regarding current or prior execution of one or more programs, provide or update user-related information (e.g., as part of registering the user with the program execution service), de-register or otherwise remove previously registered programs, suspend or terminate execution of one or more program instances, etc.

After steps 1415, 1425, or 1430, the routine continues to step 1420 and optionally performs additional housekeeping tasks, such as to update display information, store information received back from the program execution service (not shown) in response to steps 1415, 1425 or 1430, make periodic status queries of the program execution service, etc. After step 1420, the routine proceeds to step 1495 to determine whether to continue processing. If so, the routine returns to step 1405, and if not, proceeds to step 1499 and returns.

Those skilled in the art will also appreciate that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

As previously noted, various embodiments will organize computing systems of the program execution service into one or more groups in order to facilitate the implementation of policies related to the execution of programs. Additionally, computing systems may be organized in other manners, such as with a hierarchy of groups. For example, the smallest groups may each contain a single computing system, and each computing system will be assigned to its own group. The single-machine groups connected by a single network switch may then further be contained in a switch-level group that contains all of the computing systems physically connected by a single network switch. The switch-level groups may then further be contained in a data center-level group, that contains all of the computing systems in a given data center. The data center-level groups may then be further contained in a universal group that contains all of the computing systems in multiple data centers. In such an organization, the groups at each level generally have successively slower access to copies of programs located on other computing systems in the group, with the single-machine groups providing the fastest access and the universal group providing the slowest access. Such an organization may enable the efficient implementation of the application of various policies that guide the optimum placement of executing programs, as the program execution service may search for the smallest group that has both stored a copy of a particular program to be executed and has the requisite resource availability to execute the program. Alternatively, other embodiments may not model the computing systems in the program execution service by way of groups at all. Such embodiments may, for example, distribute copies of some or all of the programs to dedicated data storage computing or other systems connected to some or all of the network switches or located on some or all hardware racks, and then simply assign programs to be executed to computing systems selected at random.

As previously noted, various embodiments may implement different policies with respect to the selection of computing systems and/or groups as candidates to execute programs and/or receive distribution of program copies. In many cases, various program placement policies may entail tradeoffs between factors such as reliability and efficiency (e.g., startup latency, network latency or throughput, etc.). Placement policies may take into account factors such as the preferences of the user requesting the execution of one or more programs; the number, identity, and location of programs currently executing; the number and identity of programs currently being requested for execution; the number and identity of programs scheduled for execution in the future; the location of previously stored copies of programs; network architecture; geographic location; etc. In addition, default application of policies may in some cases be overridden or modified based on user requests or other factors in some embodiments. For example, a particular embodiment may provide a set of default policies that can be overridden by user preferences as expressed in their requests for the execution of one or more programs.

In embodiments in which the computing systems being managed by a program execution service span multiple data centers, the program execution service may prefer to execute multiple instances of a single program within the same data center and/or to execute instances of multiple distinct programs for the same user within the same data center. Such a policy will tend to allow such programs to take advantage of relatively higher bandwidth intra-data center data exchange for communications between the program instances. On the other hand, some embodiments may prefer to distribute such program instances over multiple data centers in order to assure reliability in cases of power, network, or other large-scale outages that could disable an entire data center, such as for program instances that perform little or no communication with other such program instances. Such preferences to distribute or consolidate such program instances may similarly be applied at various other levels of computing system organization, such as for physical sub-networks, groups, and individual computing systems. In addition, some embodiments may employ policies that may be used to choose between multiple candidate computing systems that are otherwise indistinguishable under the placement policies of the program execution service. For example, one embodiment may randomly select a computing system from a set of equally good candidate computing systems, whereas another embodiment may select the computing system with the lowest resource utilization, while a different embodiment may select such computing systems in a round-robin order.

In addition, various embodiments may implement different policies for the storing of copies of programs in local program storage repositories with respect to the execution of programs. For example, some embodiments may always store a local copy of a program on a local program storage repository prior to (or during or after) its execution on the computing system that houses the local program storage repository. Alternatively, in other embodiments, only some programs will be stored in such local program storage repositories. Furthermore, various embodiments may take different approaches when program storage repositories do not have sufficient capacity to store a local copy of a given program. For example, some embodiments will opt to evict or otherwise remove one or more copies of programs that have been stored in the program repository in order to make space for storing the new program, such as to evict the least recently used copy, the oldest copy, a random copy, a copy selected in a different manner, a copy of a program that is still stored in some other related program repository such as that of one or more other computing systems in a common group, etc. In other embodiments, no eviction will be performed when a given program repository is full (e.g., such as by instead periodically removing all programs from the program repository, such as daily, on reboot, etc., or by removing a program only when it is de-registered from the program execution service).

In some embodiments, programs may be decomposed into multiple, possibly fixed-size blocks of data. By decomposing a program in this manner, a computing system that is acquiring a copy of the program may distribute requests to multiple other computing systems that have stored the required program blocks in their program repositories. As some of the other multiple computing systems respond to requests for program blocks, the acquiring computing system may request additional program blocks from those responding computing systems. Accordingly, computing systems that have sufficient resource availability will be favored to provide program blocks over less responsive or unresponsive computing systems.

Some embodiments may make optimizations to improve the transfer efficiency of programs, such as by only transferring portions of programs that differ from other programs that are possibly already stored in a local program repository. Such approaches may be advantageous given multiple, incremental versions of the same program, or different programs that share significant portions of code or data. For example, if programs are decomposed into multiple, possibly fixed-sized blocks, checksums may be computed for each block and stored when the program is initially registered with the program execution service. Later, when the program is to be obtained for execution, a computing system may compare the program block checksums against checksums associated with blocks of programs resident in one or more program repositories, and then only obtain program blocks that have not already been stored. Alternatively, some embodiments may represent the program as a collection of one or more files, such as executables, data files, and library files. In such a case, two programs may have one or more files (e.g., library files) in common and a given computing system may elect only to obtain the files of a program to be obtained for execution that differ from files that have already been stored in the computing system's program repository.

Some embodiments will provide for programs that are all of a fixed size, whereas others will allow programs of various sizes. Fixed-size programs may simplify the handling of programs in the context of calculating program utilization of system resources such as memory or program repositories. In embodiments that provide for programs of various sizes, various algorithms may be applied to optimize the utilization of fixed-size resources (such as memory or disk space) to limit fragmentation when storing local copies of programs and/or when executing program instances, including various bin-packing algorithms such as best-fit, first-fit, etc.

In addition, some embodiments may provide functionality for seeding or otherwise distributing copies of programs to various of the managed computing systems in advance of requests to execute the programs. While some embodiments will provide at least one universal program repository for storing programs when they are first registered, these embodiments may suffer from high latency when the program is first executed, since the program will not be found in any program repository that is relatively local to the computing system on which it is to be executed. If such an embodiment is configured to store local copies of executed programs in local program repositories, then subsequent executions will incur relatively smaller startup latencies, when compared to the initial execution. The problem of relatively long start up latencies for the initial execution of programs can be addressed by seeding or otherwise distributing copies of programs in advance of requests to execute the program. Such embodiments may distribute one or more copies of the program to program repositories that are local to the one or more data centers that provide the program execution service. In that manner, when a program is requested to be executed for the first time, it will generally be found in a program repository that is relatively local (e.g., at least in the same data center) to the computing system or computing systems that are chosen to execute the program.

In addition, some embodiments may make optimizations in the case of the simultaneous or overlapping initiation of execution of multiple instances of a single program. In such circumstances, it may be the case that a copy of the program to be executed will need to be obtained by multiple distinct computing systems at roughly the same time. If each computing system independently obtains a copy of the program from a remote program repository, over-utilization of network and other resources may result as each computing system initiates transfers of identical data over the network simultaneously. In some circumstances, it may be beneficial for the multiple computing systems to synchronize or otherwise order their acquisition of one or more copies of the program to better utilize system resources (e.g., by minimizing unnecessary network usage). For example, when multiple computing systems selected to execute a program are part of the same group and are to acquire program copies from one or more computing systems outside of the group, it may be beneficial for a first computing system of the multiple computing systems to initially obtain (and store in a local program repository) a copy of the program from the computing systems outside of the group. After the first computing system has obtained a copy of the program, the remainder of the multiple computing systems may obtain copies from the first computing system via the common data exchange medium for the group.

In addition, various additional techniques may be used to efficiently utilize network and/or other computing resources when multiple computing systems are each to acquire a copy of a program. For example, a first of the multiple computing systems may be selected to manage the distribution of copies of the program to the other of the multiple computing systems. If none of the multiple computing systems has a stored copy of the program in a local program repository, the selected computing system may initiate the transfer of at least portions (e.g., blocks) of the program from a remote location. As portions of the program are received by the selected computing system, the selected computing system may multicast the received portions to the other of the multiple computing systems. Such multicasting may result in improved network utilization compared to other network communication mechanisms (e.g., a TCP-based transfer by each of the multiple computing systems) because fewer redundant data packets will be sent to the network connecting the multiple computing systems. Alternatively, if one or more of the multiple computing systems has a stored copy of the program in a local program repository, the selected computing system may direct at least some of the one or more computing systems that have a stored copy of the program to multicast at least portions (e.g., blocks) of the program to other of the multiple computing systems, thereby distributing the load of transferring blocks and minimizing impact on other computing systems and/or portions of the network. After such a multicast-based distribution of the program, one or more of the multiple computing systems may then utilize an alternative communications mechanism (e.g., TCP) in order to obtain any portions of the program that were not received (e.g., because of dropped network packets). The alternative distribution mechanisms may include distributing requests for portions in a round-robin or other manner that distributes load on the other of the multiple computing systems and/or portions of the network).

In some embodiments, additional techniques may further be used. For example, if a multicast-based distribution mechanism is used to distribute portions of a program to computing systems of a group from another computing system in the group, various techniques may be used to prevent or limit any network traffic outside of the group due to the multicast. For example, a short time-to-live may be specified for the multicast packets and/or using packet addressing techniques so that a switch does not transmit the multicast packets to computing systems that are not attached to the switch. Furthermore, some embodiments may implement various policies in order to minimize network resource usage, minimize load on computing systems that are not involved in the transfer or execution of copies of programs for execution, and/or provide predictable performance of network and/or computing resources. For example, some embodiments may limit the rate at which computing systems may transfer copies of programs to other computing systems, whether for multicast and/or point-to-point transmissions. In addition, some embodiments may limit the transfer rate of and/or restrict the proportion of network bandwidth that may be utilized by intermediate network devices (e.g., switches, routers, etc.) as they transfer data packets carrying portions of copies of programs between sub-networks. Such data packets may be identified by intermediate network devices based on, for example, being of a specific type and/or being destined for particular addresses (e.g., multicast IP addresses in a particular range) and/or ports. In some embodiments, multiple mechanisms such as those described above may be combined to implement various network utilization policies.

In some embodiments, various techniques may also be used to migrate one or more executing program instances from one or more computing systems to one or more other computing systems. In one aspect the migration may reflect problems related to the initial computing systems on which the program instances are executing (e.g., failure of the computing systems and/or of network access to the computing systems). In another aspect, the migration may accommodate other program instances to be executed on the initial computing systems, such as for higher-priority program executions, or to consolidate the execution of program instances on a limited number of computing systems, such as to enable the original computing systems executing the program instances to be shut down for reasons such as maintenance, energy conservation, etc. As one specific example, if the one or more program instances executing on a computing system need more resources than are available from that computing system, one or more of the program instances may need to be migrated to one or more other computing systems will additional resources. Overuse of available resources may occur for various reasons, such as one or more computing systems having less resources than expected, one or more of the computing systems using more resources than expected (or allowed), or, in embodiments in which available resources of one or more computing systems are intentionally over-committed relative to possible resources needs of one or more reserved or executing program instances. For example, if the expected resources needs of the program instances are within the available resources, the maximum resource needs may exceed the available resources. Overuse of available resources may also occur if the actual resources needed for program instance execution exceed the available resources. Migration of programs may be performed in various manners, such as to transfer copies of programs locally stored on the initial computing systems to the target destination computing systems and/or to begin executing new instances on the target destination computing systems of the programs executing on the initial computing systems. The migration may occur before the initially executing program instances terminate, if possible, such as to allow current execution state information to be transferred to the new executing program instances and/or to allow other coordination between the initial and new program instances.

Some embodiments may provide a program execution service to multiple customers in exchange for a fee. In such circumstances, customers may register or otherwise provide programs to the program execution service and request the execution of such programs in exchange for a fee. Various billing models may be used, such as for customers to purchase access to various configurations of program execution service resources (e.g., network bandwidth, memory, storage, processor) on a time basis (e.g., minutes, hours, days, etc.), to purchase access to one or more predetermined virtual or physical hardware configurations, to purchase premium services for additional fees (e.g., to provide priority execution, such as to initiate execution of a premium customer's program prior to that of a non-premium customer; to provide priority program repository placement, such as to evict programs belonging to non-premium customers prior to those of a premium customer; etc.); to purchase the ability to execute a program instance for a specified period of time on a per-instance execution basis; etc.

As previously noted, some embodiments may employ virtual computing system, and if so the programs to be executed by the program execution service may include entire virtual computing machine images. In such embodiments, a program to be executed may comprise an entire operating system, a file system and/or other data, and possibly one or more user-level processes. In other embodiments, a program to be executed may comprise one or more other types of executables that interoperate to provide some functionality. In still other embodiments, a program to be executed may comprise a physical or logical collection of instructions and data that may be executed natively on the provided computing system or indirectly by means of virtual computing systems, interpreters, or other software-implemented hardware abstractions. More generally, in some embodiments a program to be executed may include one or more application programs, application frameworks, libraries, archives, class files, scripts, configuration files, data files, etc.

Although embodiments have been described that utilize a combination of intercommunicating system manager modules and machine manager modules to manage the execution of programs within the program execution service, other implementations and allocations of responsibility between the various program execution service modules are also contemplated. For example, in some embodiments, a single module or component may be responsible for managing the execution of programs on some or all of the managed physical computing systems or virtual machines. For example, programs may be directly executed on target computing systems by way of various remote execution techniques (e.g., rexec, rsh, etc.)

Those skilled in the art will also realize that although the example embodiment described above was employed in the context of a data center used to provide a program execution service, other implementation scenarios are possible as well. For example, the described facility could be employed in the context an organization-wide intranet operated by a business or other institution (e.g., university) for the benefit of its employees and/or other members. Alternatively, the described techniques could be employed by a distributed computing system comprising nodes that are individually managed and operated by various third parties for the purpose of performing large-scale (e.g., scientific) computing tasks in a distributed manner.

Techniques are described for managing communications between multiple intercommunicating computing nodes. In some embodiments, the computing nodes include virtual machine nodes that are hosted on one or more physical computing machines or systems, and the communications include transmissions of data (e.g., messages, data packets or frames, etc.) between nodes hosted on distinct physical machines over one or more networks. In addition, in some embodiments the management of a data transmission or other communication between a source node and a destination node is provided by one or more intermediary computing nodes that are capable of identifying and manipulating the communications between the source and destination nodes. For example, in embodiments in which a source node and a destination node are each virtual machines hosted on two distinct physical computing machines, the intermediary computing nodes may include one or more other virtual machines hosted on one or both of the two physical computing machines.

In addition, in at least some embodiments the management of data transmissions includes analyzing outgoing data transmissions that are requested or otherwise initiated from a source node to one or more destination nodes in order to determine whether the data transmissions are authorized, such as under control of an intermediary computing node associated with the source node, and with the data transmissions being allowed to continue over one or more networks to the destination node(s) only if authorization is determined to exist. The determination of authorization by a intermediary computing node may, for example, be based at least in part on defined data transmission policies that specify groups of one or more source nodes that are authorized to communicate with groups of one or more destination nodes, such as when a source node and destination node both belong to a common group of nodes. In addition, an intermediary computing node associated with a source node may communicate with a distinct intermediary computing node associated with an intended destination node in order to negotiate for authorization for a data transmission, and may further store a rule or other indication that reflects the results of the negotiation for use with future data transmissions from the source node to the destination node, such as a transmission management rule that indicates that future such data transmissions are authorized if the negotiation indicates that authorization is provided for the current data transmission.

In some embodiments, an application execution service executes third-party customers' applications using multiple physical machines (e.g., in one or more data centers) that each host multiple virtual machines (which are each able to execute one or more applications for a customer), and the described techniques may be used by one or more data transmission management systems executing as part of the application execution service to control communications to and from the applications of each customer. Customers may provide applications for execution to the execution service, as discussed in greater detail below, and may reserve execution time and other resources on physical or virtual hardware facilities provided by the execution service. In addition, customers may create new groups of computing nodes (e.g., multiple computing nodes that are currently each executing one of multiple instances of a program of the customer), specify access policies for the groups, and have the membership of the groups and/or the specified access policies be updated (whether automatically or manually) to reflect changing conditions, such as to reflect new application instances that are executed, previously executing application instances that are no longer executing, and/or new or adjusted access policies (e.g., to reflect new security requirements, such as by changing whether access to other computing nodes, groups and/or applications is allowed or denied).

In some embodiments, access policies describe source nodes (also referred to as "sending nodes" or "senders") that are allowed to transmit data to a particular destination node or group of nodes, such as by describing such source nodes individually (e.g., via network address or other identifier), via ranges of network addresses or other identifiers, as one or more groups of related source nodes, etc., while in other embodiments access policies may instead in a similar manner describe destination nodes that are allowed to receive data transmissions from one or more particular source nodes or groups of nodes. In the absence of specified access policies and/or the ability to determine that a particular initiated data transmission is authorized, some embodiments may provide default access policies and/or authorization polices, such as to deny all data transmissions unless determined to be authorized, or instead to allow all data transmissions unless determined to not be authorized.

In one example embodiment, multiple data transmission manager components of a Data Transmission Management ("DTM") system work together to manage the data transmissions of a number of intercommunicating participant computing nodes. Initially, when a participant computing node comes online, a data transmission manager component associated with the participant node determines the node's network address (e.g., IP address) or other network location, any groups to which the node belongs, and indications of source nodes that are authorized to transmit data to the node. Later, when the participant node attempts to initiate communication with a remote destination node, the associated data transmission manager component detects the initiated communication, and determines whether authorization for the communication already exists based on obtained authorization for a prior communication from the participant source node to the destination node. If existing authorization is not available, the associated data transmission manager component attempts to negotiate authorization to communicate with the remote destination node, such as by communicating with a remote data transmission manager component associated with the remote destination node (e.g., by sending a negotiation request that triggers the negotiation)—a negotiation request for a data transmission from a participant source node to a destination node may contain information related to the network identity and group membership of the participant source node.

After the remote data transmission manager component associated with the remote destination node receives a negotiation request on behalf of a source node, the component determines whether the source node is authorized to communicate with the remote destination node based on any access and/or transmission policies of the remote destination node (e.g., based on the groups of which the remote destination node is a member). If it is determined that authorization exists, the remote data transmission manager component responds to the negotiation request with a reply indicating that authorization to communicate is provided. The data transmission manager component associated with the participant source node receives this reply, and proceeds to allow data to be transmitted to the remote destination node (whether by transmitting the data on behalf of the participant source node, allowing a data transmission by the participant source node to proceed, etc.). If the reply instead indicates that authorization to communicate has not been obtained, the data transmission manager associated with the participant source node proceeds to prevent the data transmission to the destination node from occurring (whether by dropping or otherwise discarding an intercepted data transmission, by indicating to the participant source node and/or others not to perform any data transmissions to the destination node, etc.). In addition, the data transmission manager component associated with the participant source node may cache or otherwise store the result of the negotiation so that future transmissions do not require the additional step of negotiation, and the data transmission manager component associated with the destination node may similarly cache or otherwise store the result of the negotiation. In this manner, data transmission manager systems dynamically determine whether the associated computing nodes that they manage are authorized to transmit data to various remote destination nodes.

For illustrative purposes, some embodiments are described below in which specific types of management of communications are performed in specific types of situations. These examples are provided for illustrative purposes and are simplified for the sake of brevity, and the inventive techniques can be used in a wide variety of other situations, some of which are discussed below, and the techniques are not limited to use with virtual nodes, with outgoing data transmissions, within one or more data centers, etc.

FIG. 1 is a network diagram illustrating an example embodiment in which multiple Transmission Manager ("TM") components manage communications between computing nodes, with the multiple TM components being part of a Data Transmission Management ("DTM") system managing the data transmissions of various computing nodes located within a data center 100. In this example, data center 100 comprises a number of racks 105, which each include a number of physical computing systems 110a-c and a rack support computing system 122. The computing systems 110a-c each provide one or more virtual machine nodes 120, which each may be employed to provide an independent computing environment to host applications within the data center 100, In addition, the computing systems 110a-c each host a TM component node 115 that manages outgoing data transmissions from other virtual machine nodes 120 hosted on the computing system, as well as incoming data transmissions from other nodes (whether local or remote to the data center 100) to those hosted virtual machine nodes on the computing system. In this example embodiment, the rack support computing system 122 provides utility services for computing systems local to the rack (e.g., data storage services, network proxies, application monitoring and administration, etc.), as well as possibly other computing systems located in the data center, although in other embodiments such rack support computing systems may not be used. The computing systems 110a-c and the rack support computing system 122 of a rack in this example all share a common, high-speed, rack-level network interconnect (e.g., via a shared backplane, one or more hubs and/or switches that are physically local or remote to the particular rack, etc.), not shown.

In addition, the example data center 100 further comprises additional computing systems 130a-b and 135 that are not located on a rack, but share a common network interconnect to a TM component 125 associated with those additional computing systems, although in other embodiments such additional non-rack computing systems may not be present. In this example, computing system 135 also hosts a number of virtual machine nodes, while computing systems 130a-b instead act as a single physical machine node. The TM component 125 similarly manages incoming and outgoing data transmissions for the associated virtual machine nodes hosted on computing system 135 and for computing system nodes 130a-b. An optional computing system 145 is also illustrated at the interconnect between the data center 100 local network and the external network 170, such as may be employed to provide a number of services (e.g., network proxies, the filtering or other management of incoming and/or outgoing data transmissions, etc.), including to manage outgoing data transmissions from some or all nodes internal to the data center 100 to nodes located in additional data centers 160 or other systems 180 external to the data center 100 and/or to manage incoming data transmissions to some or all internal nodes from external nodes. An optional DTM Group Manager component 140 is also illustrated and may provide a number of services to TM components local to the data center 100, such as to maintain global state information for the TM components (e.g., group membership information, access policies, etc.).

The example data center 100 is connected to a number of other computing systems via a network 170 (e.g., the Internet), including additional computing systems 180 that may be operated by the operator of the data center 100 or third parties, additional data centers 160 that also may be operated by the operator of the data center 100 or third parties, and an optional DIM System Manager system 150. In this example, the DTM System Manager 150 may maintain global state information for TM components in a number of data centers, such as the illustrated data center 100 and additional data centers 160. The information maintained and provided by the DTM System Manager may, for example, include group membership information, access policies, etc. Although the example DTM System Manager 150 is depicted as being external to data center 100 in this example embodiment, in other embodiments it may instead be located within data center 100.

Figure 2:
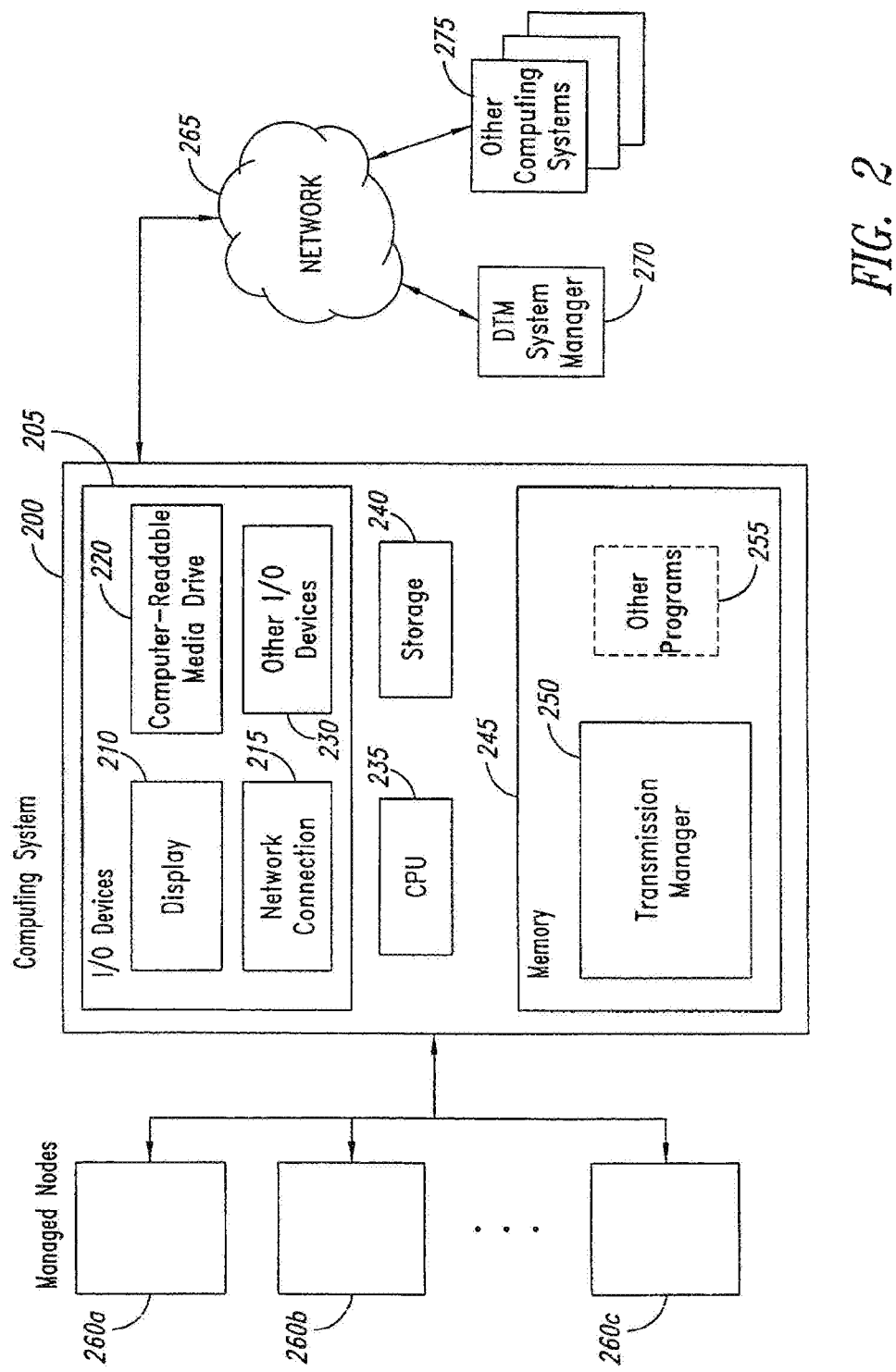
FIG. 2 is a block diagram illustrating an example computing system suitable for executing an embodiment of a system for managing communications between computing nodes.

FIG. 2 is a block diagram illustrating an example computing system suitable for managing communications between computing nodes, such as by executing an embodiment of a TM component. The example computing system 200 includes a central processing unit ("CPU") 235, various input/output ("I/O") devices 205, storage 240, and memory 245, with the I/O devices including a display 210, a network connection 215, a computer-readable media drive 220, and other I/O devices 230.

In the illustrated embodiment, an example TM component 250 is executing in memory 245 in order to manage the data transmissions between associated nodes 260a-c that are being managed and other nodes (such as those represented by the illustrated other computing systems 275 connected via a network 265). In the present example, the managed nodes 260a-c are resident on independent computing systems and are connected to the computing system 200 and TM 250 via a physical network, although in other embodiments one or more of the managed nodes 260a-c may alternatively be hosted on computing system 200 as virtual machine nodes. FIG. 2 further illustrates a DTM System Manager system 270 connected to the computing system 200, such as to maintain and provide information related to the operation of one or more TM components (such as access policies and group membership), as discussed in greater detail elsewhere.

It will be appreciated that computing systems 200, 260a-c, 270 and 275 are merely illustrative and are not intended to limit the scope of the present invention. For example, computing system 200 may be connected to other devices that are not illustrated, including through one or more networks such as the Internet or via the World Wide Web ("Web"). More generally, a "node" or other computing system may comprise any combination of hardware or software that can interact and perform the described types of functionality, including without limitation desktop or other computers, database servers, network storage devices and other network devices, PDAs, cellphones, wireless phones, pagers, electronic organizers, Internet appliances, television-based systems (e.g., using set-top boxes and/or personal/digital video recorders), and various other consumer products that include appropriate inter-communication capabilities. In addition, the functionality provided by the illustrated components and systems may in some embodiments be combined in fewer components or distributed in additional components. Similarly, in some embodiments the functionality of some of the illustrated components may not be provided and/or other additional functionality may be available.

It will also be appreciated that, while various items are illustrated as being stored in memory or on storage while being used, these items or portions of them can be transferred between memory and other storage devices for purposes of memory management and data integrity. Alternatively, in other embodiments some or all of the software components and/or systems may execute in memory on another device and communicate with the illustrated computing system via inter-computer communication. Some or all of the components, systems and data structures may also be stored (e.g., as software instructions or structured data) on a computer-readable medium, such as a hard disk, a memory, a network, or a portable media article to be read by an appropriate drive or via an appropriate connection. The systems, components and data structures can also be transmitted as generated data signals (e.g., as part of a carrier wave or other analog or digital propagated signal) on a variety of computer-readable transmission mediums, including wireless-based and wired/cable-based mediums, and can take a variety of forms (e.g., as part of a single or multiplexed analog signal, or as multiple discrete digital packets or frames). Such computer program products may also take other forms in other embodiments. Accordingly, the present invention may be practiced with other computer system configurations.

FIGS. 3A-3B illustrate examples of using group membership information for managing communications between computing nodes. The data illustrated in FIGS. 3A and 3B may be maintained and provided in various manners, such as by the DTM System Manager system 150 shown in FIG. 1 and/or by one or more of various TM components (e.g., in a distributed manner without use of a central system).

FIG. 3A depicts a table 300 that contains membership information for multiple node groups. In particular, each data row 304b-304f describes a membership association between a node denoted in column 302a and a group denoted in column 302b. Thus, for example, rows 304c and 304d indicate that node group Group2 includes at least nodes A and B, and rows 304e and 304f indicate that node D is a member of at least two groups. For illustrative purposes, the nodes in the present example are all indicated by single letters, such as 'A', 'B', 'C', etc., although they could instead be indicated in other ways in other embodiments, such as Internet Protocol ("IP") addresses, DNS domain names, etc. Similarly, groups are indicated in the present example by strings such as "Group1", but various other types of names may be used, and in at least some embodiments users may be able to specify descriptive group names for groups that they use. Column 302c indicates that various types of additional information may be specified and used for groups, such as expiration dates, contact information for the user that created or otherwise manages the group, etc. FIG. 3B depicts a table 310 that specifies access rights associated with some of the groups indicated in FIG. 3A. In particular, each data row 314b-314g indicates a named sender in column 312b that is authorized to act as a source node to transmit data to any node that is a member of the group named in column 312a. In the present example, such access rights may be specified specific to a particular transmission protocol, with three example protocols shown, those being HTTP 312c, FTP 312d, and Simple Mail Transport Protocol ("SMTP") 312e. In addition, senders may be identified in three different manners in the present example, including by IP address, by IP address range, or by group name, although other naming conventions may be employed in other embodiments (e.g., DNS domain names). For example, row 314b indicates that sending nodes that have IP addresses in the range 0.0.0.0/0 (used here to represent all hosts) may initiate communications using the HTTP protocol to nodes that are members of Group1, but that such sending nodes may not initiate communication to nodes that are members of Group1 using either the FTP or SMTP protocol. Row 314c shows that source nodes that are members of Group1 may initiate communications to nodes that are members of Group2 using the HTTP protocol, but not the FTP or SMTP protocol. Row 314d shows that source nodes that are members of Group3 may initiate communication to nodes that are members of Group2 using the HTTP or SMTP protocols, but not the FTP protocol. Row 314e shows that the single source node with the IP address 196.25.1.23 may initiate communication with member nodes of Group2 using any of the three listed protocols. Subsequent rows 314f-314h contain descriptions of additional access policies. Column 312f indicates that additional information may be specified with respect to access policies (e.g., additional protocols, types of operations, types of data formats, policy expiration criteria such as timeouts, contact information for the user that created or otherwise manages the policy, etc.).

In the example shown in FIG. 3B, access policies may be specified on a per-transmission protocol basis. In the present example, when a source is granted access via a particular protocol, such as HTTP, this may be taken to mean that the sender may send Transmission Control Protocol ("TCP") packets to nodes in the specified group at the default port for HTTP, port 80. Other embodiments may allow access rights to be specified at other levels of details, such as to not indicate particular protocols, or to further specify particular ports for use with particular protocols. For example, some embodiments may allow access rights to more generally be specified with respect to any transmission properties of particular network transmissions, such as types of packets within particular protocols (e.g., TCP SYN packets, broadcast packets, multicast packets, TCP flags generally, etc.), connection limits (e.g., maximum number of concurrent connections permitted), packet size, packet arrival or departure time, packet time-to-live, packet payload contents (e.g., packets containing particular strings), etc. In addition, other embodiments may specify access policies in various manners. For example, some embodiments may provide for the specification of negative access policies, such as ones that specify that all nodes except for the specified senders have certain access rights. Also, different embodiments may provide varying semantics for default (unlisted) access policies. For example, some embodiments may provide a default policy that no sender may communicate with nodes of a given group unless authorized by a particular other policy, with other embodiments may provide a default policy that senders operated by a given user may by default communicate with any other nodes operated by the same user, or that nodes in a given group may by default communicate with other nodes in the same group. Finally, various embodiments may specify groups and group membership in various ways, such as by providing for hierarchies of groups or to allow for groups to be members of other groups, such that a policy would apply to any node below an indicated point in the hierarchy or to any node that is a member of a indicated group or of any sub-groups of the indicated group.

FIGS. 4A-4F illustrate examples of dynamically modified transmission management rules used for managing communications between computing nodes. In the example embodiment, the transmission management rules are used by a given TM component to make decisions about whether to authorize or not authorize data transmissions by one or more associated nodes that are managed by the TM component, with each TM component maintaining its own set of rules. In other embodiments, the rules shown in FIGS. 4A-4F could alternatively be maintained by the DTM Group Manager component 140 of FIG. 1, the DTM System Manager system 150 of FIG. 1, or one or more other components that provide shared access to one or more TM components.

In the example illustrated in FIGS. 4A-4F, two example TM components DTM1 and DTM2 dynamically generate and modify transmission management rules over time based on initiated data transmissions, with DTM1 managing two associated nodes A and B and with DTM2 managing associated node D. Both example DTMs also maintain information related to the group memberships of nodes being managed, as well as to associated access policies for the groups. In the present example, node A belongs to Group1, node Et belongs to Group2, and node D belongs to Group3 and Group4, as shown in rows 304b-e in FIG. 3A. The DTMs may obtain information about group membership and access policies in various ways. For example, when a new node to be managed by a particular DTM comes online, the DTM may be notified of this new node and its network address (e.g. IP address), and the DTM may be able to access the group membership and access policy information for the new node (e.g., by querying and/or being notified by the DTM Group Manager component 140 or the DTM System Manager system 150, by retrieving the information from a network-accessible data store, etc.). In addition, changes related to group membership (e.g., a particular existing node is added to or removed from a group) and access policies (e.g., the access policies related to a particular group are modified, such as to now allow data transmissions from another group that previously did not have such authorization) may be communicated to DTMs in a variety of ways. In some embodiments, only the DTMs that are managing nodes affected by a particular change will be notified, such as via information sent from, for example, a DIM Group Manager component and/or a DTM System Manager system. In other embodiments, such changes may be broadcast to all DTMs, or instead all DTMs may be configured to periodically poll an appropriate component in order to obtain updates related to such state changes.

Figure 4A:
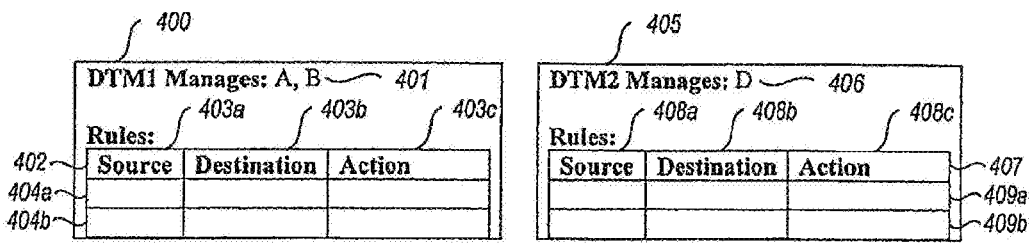
FIGS. 4A-4F illustrate examples of dynamically modified transmission management rules used for managing communications between computing nodes.

FIG. 4A illustrates initial conditions for DTM1 and DTM2 before any of the three nodes have initiated any communications with other nodes. Table 400 represents the transmission management rule set and other information maintained by DTM1. Row 401 lists the nodes that are currently managed by DTM1, in this case nodes A and B. Table 400 further includes a sub-table 402 that shows the transmission management rules maintained by DTM1. Each row 404a-404b can hold a transmission management rule that describes a transmission policy with respect to a node, with each rule specifying a source 403a, a destination 403b, and an action 403c. Because no nodes have initiated communication at this point, the rule set shown is empty, although in some embodiments a low priority default rule may be included (e.g., if no other rules apply, deny an initiated data transmission). Similarly, Table 405 shows the transmission management rules maintained by DTM2. Row 406 shows that DTM2 manages a single node, D. In addition, sub-table 407 shows an empty transmission management rule set, because node D has yet to initiate any communication.

Figure 4B:
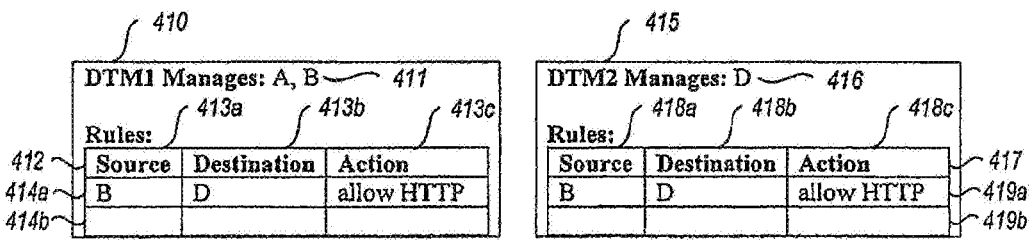

FIG. 4B shows the state of the rule sets after node B has initiated communication with node D via the HTTP protocol. When node B attempts to begin to transmit data to node D, DTM1 first inspects its rule set to determine whether there are any existing rules that govern data transmissions from node B to node D. Finding none, DTM1 negotiates with DTM2 to determine whether node B is authorized to transmit data to node D, and as part of the negotiation DTM1 informs DTM2 that node B has attempted to transmit data to node D via HTTP and that node B is a member of Group2, In some embodiments, such a negotiation involves DTM1 generating and transmitting a negotiation message to destination node D, with the expectation that node D's DTM (whose identity and network address may be unknown to DTM1) will intercept and respond to the negotiation message in an appropriate manner. As described above, DTM2 knows that node D is a member of groups Group3 and Group4, as shown in rows 304e and 304f of FIG. 3A, and that Group3 has allowed members of Group2 to initiate communications via the HTTP protocol, as shown in row 314f of FIG. 3B. Because the desired communication is allowed by the stated access policies, DTM2 responds to the negotiation request by sending a response that indicates authorization for node B to communicate with node D to DTM1. DTM2 further stores a transmission management rule in row 419a that allows HTTP communication from source node B to destination node D. After DTM1 receives the response indicating authorization from DTM2, it also stores a transmission management rule in row 414a that allows HTTP communication from source node B to destination node D. In the present example, because the two DTMs have negotiated and stored rules granting authorization for node B to transmit data to node D via HTTP, future data transmissions from node B to node D using the same protocol will not necessitate the re-negotiation of authorization. In addition, while not illustrated here, in some embodiments the DTM components will also automatically authorize at least some data transmissions from node D to node B (e.g., to authorize replies from node D to data transmissions to node D from node B), whether by adding corresponding transmission management rules or by otherwise authorizing such data transmissions.

In some embodiments, any data destined for node D that was received from node B by DTM1 before the negotiation completed would have been queued by DTM1 until it was determined whether or not node B was authorized to transmit data to node D. In such embodiments, after having received an indication of authorization to communicate with node B, DTM1 would then transmit any queued data to node D, as well as any data that arrived subsequent to the negotiation. In other embodiments, any data destined for node D that was received from node B by DTM1 prior to the completion of the negotiation would instead be discarded by DTM1. Such techniques may be appropriate in situations in which some data transmission loss is acceptable or in which a sending node will resend any data transmissions that are not received and acknowledged by the intended recipient. For example, many transmission protocols will retransmit any lost packets (e.g., based on the timeout and retransmission mechanisms of TCP), and while such a discard-based approach may result in the initial loss of some packets that should ultimately have been delivered (e.g., in the case of a successful negotiation) in this situation, the retransmission will ensure that those initial packets will be resent. Alternatively, in some embodiments before a negotiation is completed or authorization is otherwise obtained for node B to transmit data to node D, the data transmissions could be sent toward node D and be queued at DTM2 (e.g., after being intercepted by DTM2) until authorization is obtained or DTM2 otherwise determines to forward the queued data transmissions to node D (or to discard the data transmission if authorization is ultimately not obtained).

Figure 4C:
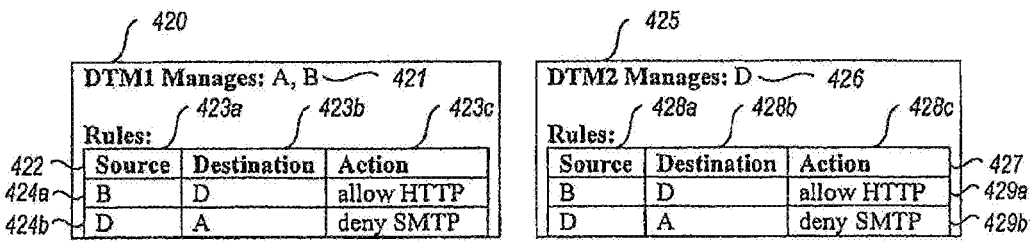

FIG. 4C shows the state of the rule sets after node D has initiated communication with node A via the SMTP protocol. When node D attempts to begin to transmit data to node A, DTM2 first inspects its rule set to determine whether there are any existing rules that govern data transmissions from node D to node A. Finding none, DTM2 negotiates with DTM1 to determine whether node D is authorized to transmit data to node A using the given protocol. DTM2 informs DTM1 that node D is a member of Group3 and Group4 as shown in 304e and 304f in FIG. 3A, and that node D has attempted to communicate with node A via SMTP. DTM1 knows that node A is a member of Group1 as shown in row 304b in FIG. 3A and that Group1 has granted access to all hosts to communicate with it via HTTP, but not SMTP, as shown in row 314b of FIG. 3B. Because no host is allowed to transmit data to node A using the SMTP protocol, DTM1 responds to the negotiation request by sending a response to DTM2 that indicates a denial of authorization for node D to communicate with node A via the SMTP protocol. DTM1 further stores a transmission management rule in row 424b that denies SMTP communication from source node D to destination node A. After DTM2 receives the response indicating a denial of authorization from DTM1, it also stores a transmission management rule in row 429b that denies authorization for future SMTP communications from source node D to destination node A. Again, any data that node D attempted to transmit to node A prior to the completion of the negotiation would have been queued by DTM2 in at least some embodiments. Upon completion of the negotiation process, DTM2 would then drop any queued and all future data sent by node D to node A via the SMTP protocol.

Figure 4D:
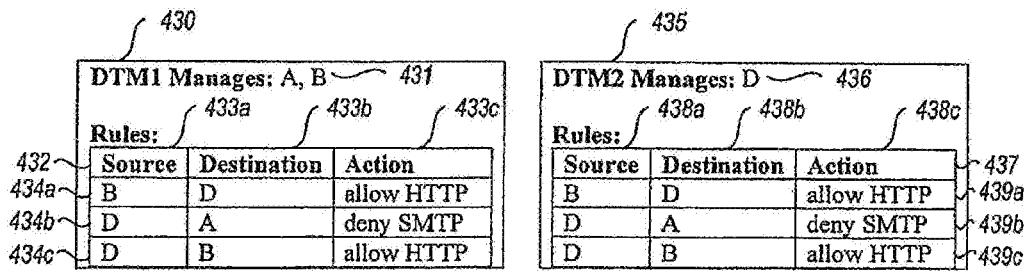

FIG. 4D shows the state of the rule sets after node D has attempted to initiate communication with node B via the HTTP protocol. In effect, the situation described with reference to this figure is the reverse case of the situation described with reference to FIG. 4B, above. An inspection of the tables shown in FIGS. 3A and 3B shows that this communication is authorized, because node B belongs to Group2 (FIG. 3A, row 304c), Group2 has granted authorization to members of Group3 to transmit data via the HTTP protocol (FIG. 3B, row 314d), and node D is a member of Group3 (FIG. 3A, row 304e). Therefore, DTM2 will successfully negotiate authorization for node D to transmit data to node B via HTTP, the applicable rule will be added by DTM2 in row 439c and by DTM1 in row 434c, and data sent from node D via the HTTP protocol to node B will be forwarded by DTM2. Note also that in this example that node D is permitted to transmit data to node B via multiple protocols (e.g., both HTTP and SMTP). Some embodiments may perform an optimization in such cases by responding to a negotiation request regarding a particular transmission protocol with a response that indicates all of the transmission protocols that the sending node is authorized to use to communicate with the destination node (as opposed to only the requested protocol), such as to in this example cause additional rules to be added for DTM1 and DTM2 to indicate that node D is authorized to send SMTP communications to node B. Such an optimization eliminates the need to perform additional later negotiations with respect to the other authorized protocols.

Figure 4E:
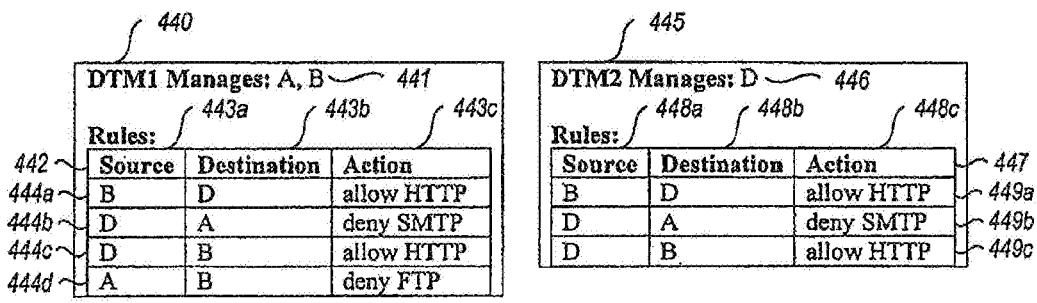

FIG. 4E shows the state of the rule sets after node A has attempted to initiate communication with node B via the FTP protocol. In this case, the source and destination nodes are both managed by the same DTM, and in some embodiments DTM1 may not manage such data transmissions, although in the illustrated embodiment such data transmissions are managed (although DTM1 does not have to negotiate with a remote DTM in this case). An inspection of the tables shown in FIGS. 3A and 3B shows that this communication is not authorized, because node B belongs to Group2 (FIG. 3A, row 304c), node A belongs to Group1 (FIG. 3A, row 304b), but Group2 has not granted authorization for members of Group1 to transmit data via the FTP protocol (FIG. 3B, row 314c). DTM1 therefore adds the applicable rule to row 444d and drops any data transmitted from node A to node B using the FTP protocol.

Figure 4F:
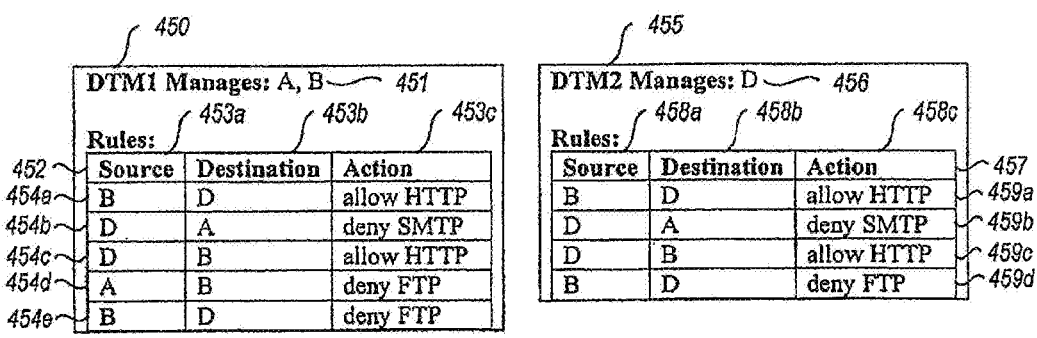

FIG. 4F shows the state of the rule sets after node B has attempted to initiate communication with node D via the FTP protocol. This figure shows an example of an attempt by a source node to transmit data to a previously allowed destination node, but using a different protocol. An inspection of the tables shown in FIGS. 3A and 3B shows that this communication is not authorized, because node B belongs to Group2 (FIG. 3A, row 304c), node D belongs to Group3 (FIG. 3A, row 304e) but Group3 has not granted authorization to members of Group2 to transmit data via the FTP protocol (FIG. 3B, row 314f). Therefore, DTM1 will not be successful in negotiating authorization for node B to transmit data to node D via FTTP and the applicable rule will be added by DTM1 in row 454e and by DTM2 in row 459d. In addition, DTM1 will drop any data transmitted from node B to node D using the FTP protocol.

Thus, in the manner indicated, the transmission manager components may dynamically create transmission management rules based on managing initiated data transmissions. While not illustrated here, in other embodiments the rule sets for a transmission manager component and/or for a particular node may be modified in other manners, such as to remove all rules corresponding to a node after its associated group membership or other relevant information changes (e.g., after a program being executed on behalf of a first customer on a virtual machine node is terminated) so that the node (or another node that is later allocated the same relevant information, such as the same network address as was previously used by the node) will need to re-negotiate to determine appropriate authorizations, or instead to remove only rules that are affected by a particular change. For example, if the access policies for group3 are dynamically changed at the current time so that group2 no longer is authorized to sent HTTP communications to group3, node B (of group2) will no longer be authorized to send HTTP transmissions to node D (of group3). Accordingly, rule 454a for DTM1 and rule 459a for DTM2 are no longer valid, and the change to the access policy will prompt those two rules to be removed, but other rules involving nodes B and D (e.g., rules 454e and 459d for DTM1 and DTM2, respectively) may be maintained in at least some embodiments.

Figure 5:
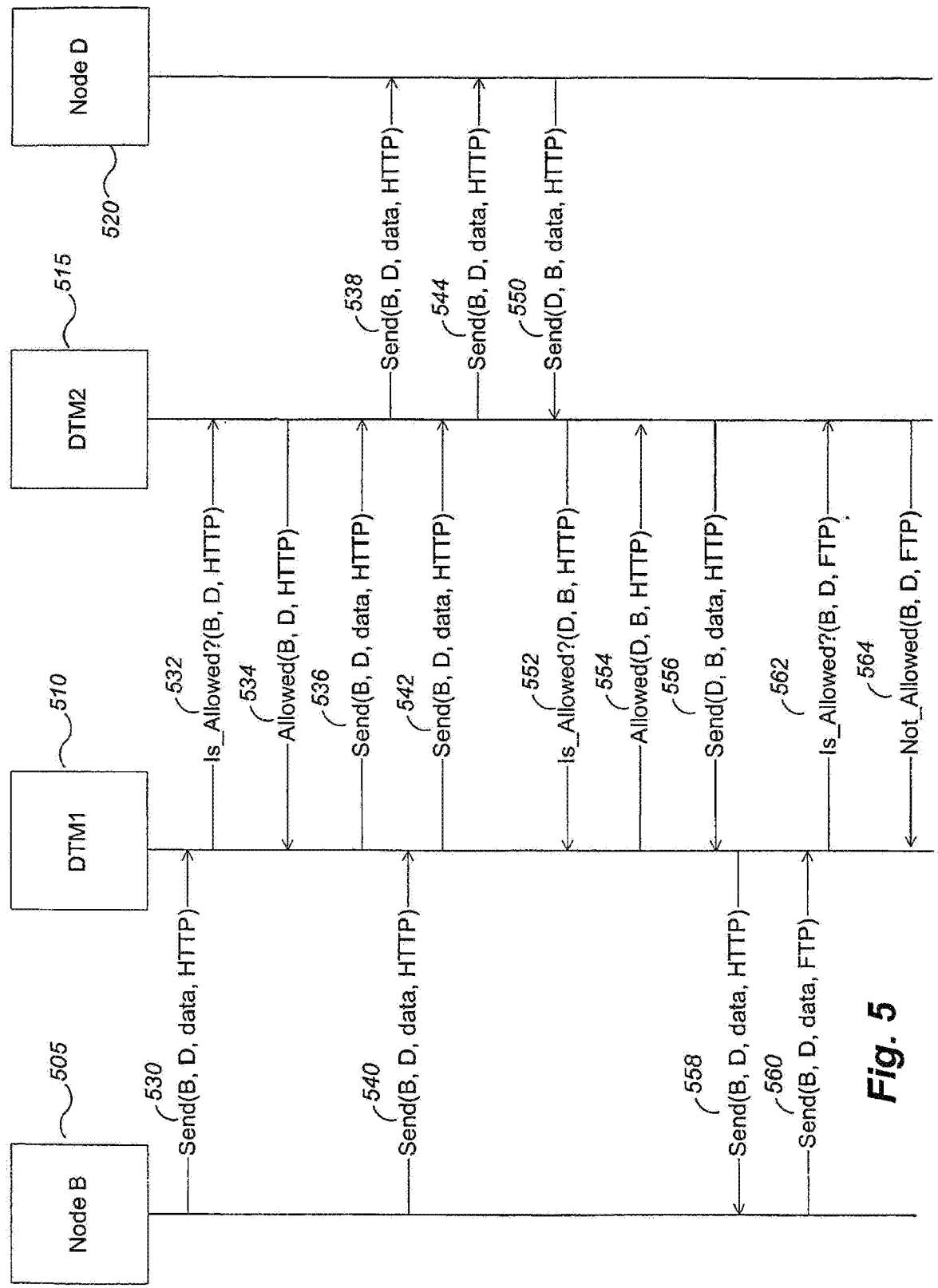
FIG. 5 illustrates examples of data transmissions between two intercommunicating computing nodes and associated transmission manager components that manage the communications.

FIG. 5 illustrates examples of data transmissions between two intercommunicating computing nodes and associated transmission manager components that manage the communications, with the data transmissions shown in a time-based order (with time proceeding downwards). The message names and message contents in this example are illustrative of messages that may be passed between DTM 1 and DTM 2 while managing nodes B and D, although other message passing or other interaction schemes are possible in other embodiments. In addition, in some embodiments the initiation of a data transmission and the corresponding protocol being used may be determined by inspecting underlying data and/or control packets that are detected (e.g., TCP packets, User Datagram Protocol ("UDP") packets, etc.). In particular, FIG. 5 shows an example of messages passed between nodes and DTMs during a successful negotiation as described with reference to FIG. 4B. Initially, node B 505 attempts to send data via the HTTP protocol to node D 520 by transmitting a Send message 530. DTM1 510 receives this message and takes it as an indication that node B is attempting to transmit data to node D. At this point, DTM1 has no rules governing such transmissions, so it attempts to negotiate permission with DTM2 515. In this example it does so by sending an Is_Allowed? message 532 that is received by DTM2, although in at least some embodiments the message 532 is addressed to remote destination node D but intercepted by the DTM that manages the data transmissions for that remote node, as discussed in greater detail elsewhere (in this way, a sending DTM may operate without knowledge of the network location of the remote DTM). DTM2 determines by inspection of the appropriate data that node D has authorized such transmissions, and therefore sends an Allowed message 534 that is received by DTM1. Having received authorization to transmit, in the illustrated embodiment DTM1 transmits the data queued from the Send message 530 in a second Send message 536 to node D that is again received by DTM2, who forwards this data via Send message 538 to its final destination of node D 520. As previously noted, in other embodiments DMT1 may not queue the Send message 530 while performing the negotiation, and thus would not transmit the Send message 536 in this example. Subsequent to the negotiation, node B attempts to transmit more data to node D by sending a Send message 540. Since DTM1 has previously negotiated authorization for this type of data transmission, it forwards the data via Send message 542 without additional negotiation. DTM2 receives Send message 542 and similarly forwards the data to node D via Send message 544.

Next, FIG. 5 shows an example of messages passed between nodes and DTMs during a successful negotiation as described with reference to FIG. 4D. Initially, node D attempts to transmit data to node B via HTTP by way of the Send message 550. If the data transmission is related to the prior authorized data transmissions from node B to node D using HTTP (e.g., is a reply to received Send message 544 or otherwise is part of the same session), DTM1 and DTM2 will in some embodiments automatically have authorized such reply data transmissions as part of the prior negotiation process, as discussed in greater detail elsewhere—this ability to automatic authorize such replies may provide various benefits, such as to enable some types of transmission protocols (e.g., TCP) to function effectively. In this example, however, DTM2 instead initiates a separate authorization negotiation for the data transmission with the Is_Allowed? message 552. DTM1 determines by inspection of the appropriate data that node B has authorized such transmissions, and therefore responds with an Allowed message 554. Finally, DTM2 forwards the queued data from Send message 550 by way of a new Send message 556, which DTM1 forwards to its ultimate destination by way of Send message 558. Finally, FIG. 5 shows an example of messages passed between nodes and DTMs during a negotiation that results in a denial of authorization as described with reference to FIG. 4F. Initially, node B attempts to transmit data to node D via FTP by way of the Send message 560. DTM1 initiates negotiation with DTM2 via the Is_Allowed? message 562. DTM2 determines by inspection of the appropriate data that node D has not authorized such transmissions, and therefore responds with a Not Allowed message 564. In response, DTM1 drops the data received by way of the Send message 560.

Figure 6:
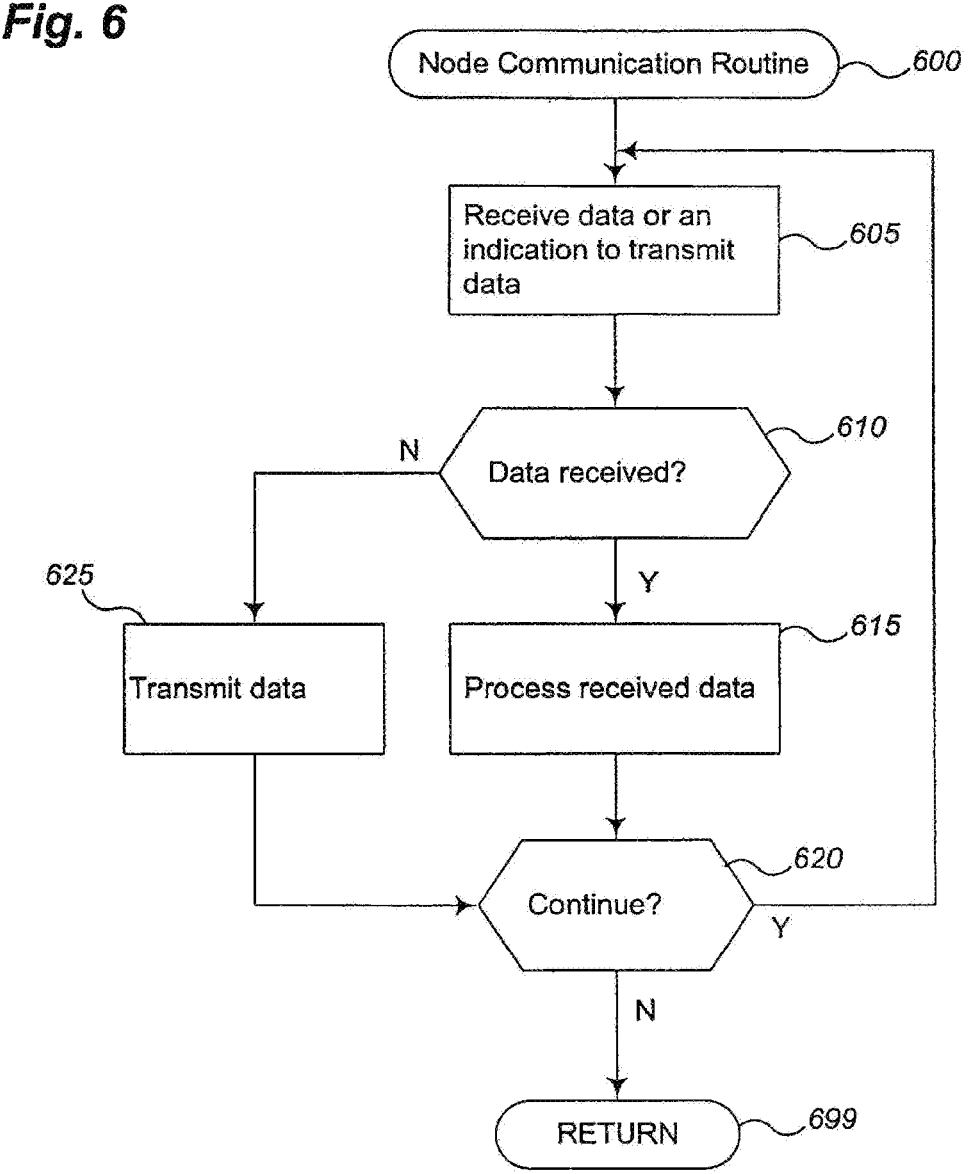
FIG. 6 illustrates a flow diagram of an example embodiment of a Node Communication routine.

FIG. 6 illustrates a flow diagram of an example embodiment of a Node Communication routine 600. The routine may be performed as part of the actions of a communicating node, such as virtual machine node 120 or computing system node 130*a* shown in FIG. 1.

The routine begins in step 605, where it receives data sent from another node or an indication to transmit data to a remote node (e.g., from another part of the actions of the node). In step 610, the routine determines whether data was received from another node. If so, it proceeds to step 615 and processes the received data. If it was instead determined in step 610 that an indication to transmit data was received, the routine proceeds to step 625 and transmits data to the appropriate destination. After step 625 or 615 the routine proceeds to step 620 to determine whether to continue. If so, the routine returns to step 605, and if not continues to step 699 and ends.

Figure 7B:
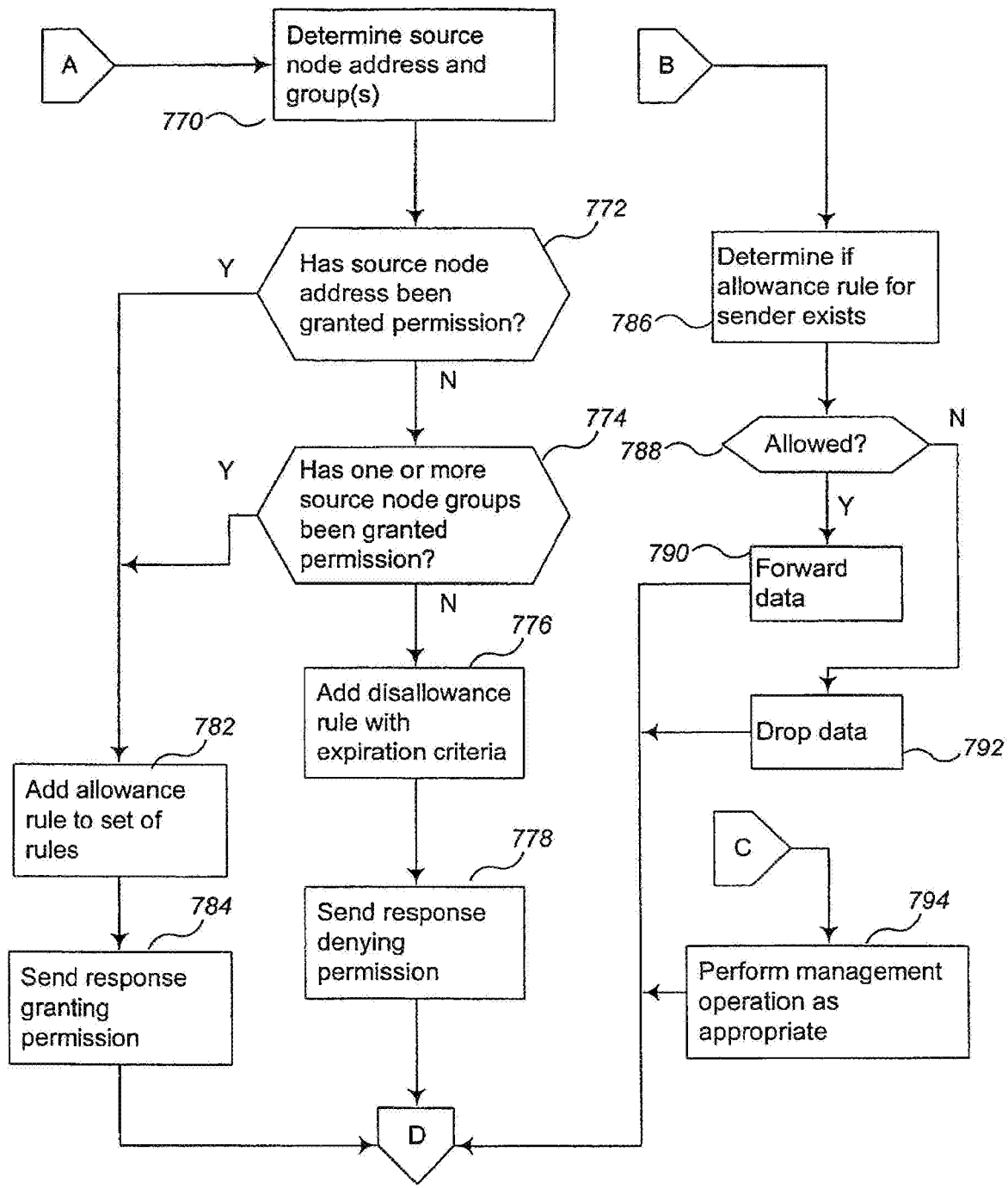

FIGS. 7A-7B illustrate a flow diagram of an example embodiment of a Transmission Manager routine 700. The routine may be provided by execution of, for example, a data transmission manager component, such as DTM 115 or DTM 125 shown in FIG. 1.

The routine begins in step 705 and receives an outgoing transmission, an incoming transmission, a negotiation request, or a management message. The routine then proceeds to step 710 and determines the type of message or request received in step 705. If it is determined in step 710 that the routine has received an indication of an outgoing transmission, the routine proceeds to step 715 to determine whether it has an applicable rule indicating a prior negotiation for authorization. An applicable rule may be one that either allows or denies the transmission from the source node to the destination node indicated by the outgoing transmission. If it is determined that no such rule exists, the routine proceeds to step 720 and initiates a negotiation for authorization by sending a request to the destination node. In the example embodiment, while the request is sent to the destination node, it is intercepted by a remote DTM that manages the destination node (thus allowing the DTM to initiate negotiation without specific knowledge of the network address of the remote DTM), although in other embodiments the negotiation request message may instead be send directly to an appropriate DTM (e.g., via a mapping of destination nodes to the remote DTMs that manage them) or in another manner. Next, the routine proceeds to step 725 to receive either a response or a timeout. A timeout may be received if for some reason the remote DTM has gone offline or is otherwise unreachable. If no response from the remote DTM is received within a pre-determined timeout, the lack of response is treated as a response that denies authorization to communicate in this embodiment, although in other embodiments the lack of a response could be treated as an authorization or could trigger additional attempts to negotiate for authorization. The routine then proceeds to step 730 to determine whether authorization has been granted to transmit data from the source to the destination node. If an explicit allowance of authorization was received (e.g. a message containing an indication of authorization), the routine proceeds to step 735 and adds an allowance transmission management rule that authorizes future data transmissions from the source to the destination node. If instead the routine receives an explicit denial of authorization or a timeout, the routine proceeds to step 765 to add a rule indicating a denial of authorization, and drops any data that is received from the source node and bound for the given destination node. In this example, the added denial of authorization rule includes expiration criteria, such as a timeout or expiration date, such as to force renegotiation of data transmission rules on a periodic basis in order to assure that dynamic changes to group memberships, access policies, and/or node network identities will be correctly reflected in the rule sets maintained by various DTMs.

If it is instead determined in step 715 that a rule governing data transmissions from the source node to the destination node does exist, the routine proceeds to step 755 to determine whether the rule authorizes such transmissions. If so, or after step 735, the routine proceeds to step 740 and transmits the data from the source node to the destination node. If it is instead determined in step 755 that the rule denies authorization for data transmissions from the source node to the destination node, the routine proceeds to step 760 and drops any data from the source node that is bound for the given destination node. Note that in embodiments that do not queue and instead discard data received during pending negotiations for authorization, steps such as 725 and 740 may be somewhat simplified. For example, an embodiment that does not queue data while awaiting a response to a negotiation request may not wait to receive a timeout as described with reference to step 725 above, because there will be no accumulation of queued data to either discard or transmit depending on the outcome of the pending negotiation. In addition, in such cases the routine may proceed directly from step 735 to step 745, bypassing step 740, because there will be no data to transmit (since any data that initiated an authorization negotiation would have been discarded rather than queued).

If it is instead determined in step 710 that the routine has received a negotiation request from a remote DTM that is attempting to obtain permission for a source node to communicate with one of the destination nodes managed by the DTM, the routine proceeds to step 770 to determine the source node address and the groups to which the source node belongs. In some embodiments, some or all of information will be provided to the DTM as part of the received negotiation request from the remote DTM. Alternatively, the DTM may acquire some or all of this information in other manners, such as from another system component (e.g., the DTM Group Manager 140 or DTM System Manager 150 of FIG. 1). Next, the routine proceeds to step 772 to determine whether the network address of the source node has been granted authorization to communicate with the destination node. If not, the routine continues to step 774 to determine whether at least one of the source node's groups has been granted permission to communicate with the destination node. If not, the routine continues to step 776 and adds a rule that denies authorization for transmissions from the source node to the destination node which may include expiration criteria to force renegotiation of data transmission rules on a periodic basis. Next, the routine continues to step 778 and sends a response to the remote DTM denying authorization to communicate. If it is instead determined in step 772 or step 774 that the source node has been granted authorization to communicate with the destination node, however, the routine proceeds to step 782 and adds a rule that authorizes communication from the source node to the destination node. Next, the routine proceeds to step 784, where it sends a response to the remote DTM indicating the authorization for the source node to communicate with the destination node.

If it is instead determined in step 710 that the routine has received incoming data, the routine proceeds to step 786. In step 786, the routine determines whether a rule exists in the rule set that authorizes communication from the source node of the incoming data to the destination node of the incoming data. If it is so determined in step 788, the routine continues to step 790 and forwards the data onwards to the final destination node. If no rule exists that denies authorization for such communication, or a rule exists that explicitly denies authorization for such communication, the routine proceeds to step 792 and drops the incoming data. In addition, in some embodiments the DTM may in this case send a message to the remote DTM that originally sent the data that such communication was not permitted, thereby informing the remote DTM that it should invalidate some or all of the rules related to this particular destination node.

If it is instead determined in step 710 that the routine has received a management message, the routine proceeds to step 794. Management messages may include notifications that one or more of the nodes managed by the DTM have gone offline, notifications that a new node to be managed by the DTM has come online, etc. In some embodiments, when a new node comes online, the DIM that manages the new node may determine network location (e.g. network address) of the new node, the groups to which the new node belongs, the source nodes or other senders (individual nodes or groups) that have been granted authorization to communicate with the new node, the particular protocols that senders may use to communicate with the new node, etc. In other embodiments, the DTM may alternatively delay the acquisition of such information until a later time, such as when the new node first sends outbound communication, or when the first inbound communication destined for the new node arrives. Such information may be obtained by the DTM by communicating with other system components such as the DTM Group Manager 140 or the DTM System Manager of FIG. 1, or by reference to network-accessible data stores. Similarly, when a node managed by the DTM goes offline, the DTM may flush any rules from its rule set that reference the node as either a source or a destination node. The DTM may also flush any information related to the network identity, group membership, and/or access policies of the node.

After steps 760, 740, 765, 784, 778, 790, 792 or 794, the routine continues to step 780 to optionally perform housekeeping tasks (e.g., checking the expiration criteria associated with rules stored in a TM component's rule set). In some embodiments rules may be set to expire automatically after a specified time interval. In other embodiments, the DTM periodically examines the rules in the rule set and flushes or deletes those that have reached a certain age. Other housekeeping tasks may include operations such as updating or rotating logs, or handling additional messages or requests not illustrated in the above flowchart. For example, in some cases the above example embodiment of a DIM will have an authorization rule that has gone stale—that is, the authorization rule will make reference to a destination node that has at some point after the initial negotiation of permission gone offline. In such a case, the DTM may not be aware that the destination node has gone offline until one of the source nodes under the management of the DTM attempts to transmit data to that node. Because the DIM has a rule that allows such transmission, the DTM will transmit the data to the destination node. However, the remote DTM will reject the transmission and reply with a message informing the DTM to invalidate the rule that allowed such a transmission (or alternatively all rules that reference the node as a destination node). In response, the DTM will flush some or all stored rules related to the given destination node as appropriate.

After step 745, the routine proceeds to step 750 to determine whether to continue. If so, the routine returns to step 705, and if not continues to step 799 and ends.

Figure 8:
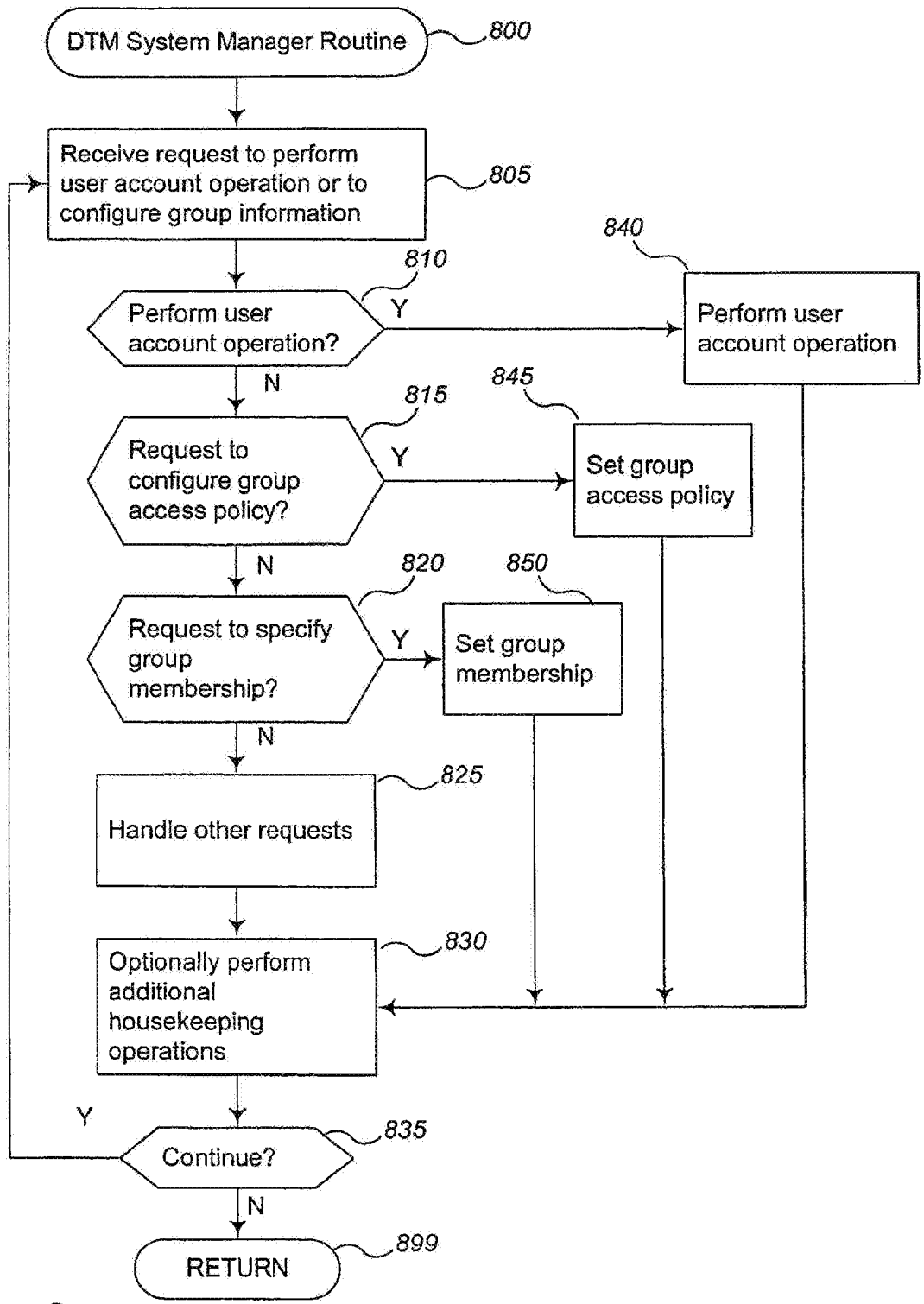
FIG. 8 illustrates a flow diagram of an example embodiment of a DTM System Manager routine.

FIG. 8 illustrates a flow diagram of an example embodiment of a DIM System Manager routine 800. This routine may be provided by execution of, for example, the DTM System Manager 150 shown in FIG. 1. The routine begins in step 805 and receives a request to perform a user account operation or to configure group information. Next, the routine proceeds to step 810 to determine whether it has received a request to perform a user account operation. If so, it proceeds to step 840 and performs the requested user account operation as appropriate (e.g., creation or deletion of user accounts, modifications to user account settings such as billing information, the reservation of computing time or other resources provided by the data center, the provision and management of machine images or application profiles, etc.). If it is not determined that a user account operation has been requested in step 810, the routine continues to step 815 to determine whether it has received a request to configure group access policy. If so, the routine continues to step 845 and sets or otherwise configures a group access policy as requested and as appropriate. These access policies may, for example, resemble those depicted in the table of FIG. 3B. In some cases, the routine may in addition notify some DTMs (e.g., only those that are managing nodes that are affected by the indicated access policy) or all of the DTMs of the indicated access policy. If it is not determined in step 815 that a request to configure a group access policy has been received, the routine proceeds instead to step 820 where it determines whether it has received a request to specify group membership. If so, it continues to step 850 and performs modifications to group membership information as appropriate. In some cases, the routine may in addition notify some DTMs (e.g., only those that are managing nodes that are affected by the group membership specification) or all of the DTMs of the group membership modification. If it is not determined in step 820 that a request to specify group membership has been received, the routine proceeds instead to step 825 to handle other requests. Other requests may include operations such as the creation of new groups, the deletion of groups, modifications to existing groups or user accounts not handled by the steps above, etc. After steps 830, 840, 845, or 850, the routine proceeds to step 830 and optionally performs additional housekeeping operations (e.g., the periodic generation of billing information for users, access and operation logging or log rotation, system backups, or other management or administrative functions).

Next, the routine proceeds to step 835 to determine whether to continue. If so, the routine proceeds to step 805 to process additional incoming requests. If not, the routine proceeds to step 899 and returns.

Those skilled in the art will also appreciate that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

As previously noted, in some embodiments the initiation of a data transmission or other communication by a computing node may occur and may be identified by an associated data transmission manager component in a variety of ways. In some embodiments, the computing node may send an explicit message to the TM component that manages it requesting permission to communicate with a remote node, while in other embodiments the existence of the TM and the authorization negotiation that it performs may be entirely transparent to the computing node—if so, the computing node simply attempts to send data to the remote node, while the TM component monitors and processes all outgoing transmissions from the computing node. When the TM component identifies an initiated data transmission from the computing node (whether by receiving an explicit request message from the computing node, by detecting an outbound transmission for which it has not already negotiated permission, such as by inspecting the source and destination network addresses of TCP or UDP packets as they flow across a network interface, etc.), the TM components initiates an authorization negotiation if the existence of authorization or an authorization denial does not already exist. While the TM component negotiates authorization, it may queue the outgoing data from the computing node that is bound for the remote destination node and process the data according to the authorization negotiation results (e.g. by allowing or preventing the data transmission to proceed to the destination node), as well as optionally manipulate data before it is forwarded on to the destination node (e.g., to include indications of obtained authorization for use by the destination computing node and/or destination transmission component in verifying authorization and/or authenticity of the data transmissions; to modify the manner in which the data is transmitted, such as to change the data format and/or transmission protocol to reflect preferences of the destination computing node or for other reasons; to modify the data that is transmitted, such as by adding and/or removing data; etc.).

In addition, various embodiments may provide mechanisms for customer users and other users to interact with an embodiment of the DTM system. For example, some embodiments may provide an interactive console (e.g. a client application program providing an interactive user interface, a Web browser-based interface, etc.) from which users can manage the creation or deletion of groups and the specification of communication access policies or group membership, as well as more general administrative functions related to the operation and management of hosted applications (e.g., the creation or modification of user accounts; the provision of new applications; the initiation, termination, or monitoring of hosted applications; the assignment of applications to groups; the reservation of time or other system resources; etc.). In addition, some embodiments may provide an API ("application programming interface") that allows other computing systems and programs to programmatically invoke such functionality. Such APIs may be provided by libraries or class interfaces (e.g., to be invoked by programs written in C, C++, or Java) and/or network service protocols such as via Web services.

In addition, various implementation architectures are possible for embodiments of the DTM system. In some embodiments, multiple TM components may act in a distributed manner to each manage the data transmissions of one or more associated nodes, whether by each operating as an independent autonomous program or by cooperating with other TM components, and may possibly be hosted virtual machines on the same computing system as the nodes being managed or may instead operate on computing systems remote from the nodes that they manage. While authorization negotiations have been described in which TM components interact directly with each other, in other embodiments such TM components may instead negotiate authorizations in other manners, such as by communicating with a central component that manages communication policies for the entire system, or by referencing configuration files or other static information stores that are available locally or over a network. In addition, the authorization negotiation performed by TM components may have a variety of forms. For example, in some embodiments, the actual network address or other identity of a remote TM component may be known to a TM component initiating a negotiation, and if so, that TM component may interact directly with that remote TM component, while in other embodiments the TM component may send information to the network address of the destination computing node with the expectation that the sent information will be intercepted by the appropriate remote TM component. In other embodiments, a single, central TM component or other component may manage the data transmissions for a large number of computing nodes (e.g. an entire data center) if the single component has access to data transmissions initiated by those nodes (whether due to configuration of the nodes or to a network structure or other mechanism that provides such access). In still other embodiments, the functionality of a TM component may be distributed, such as by being incorporated into each of the computing nodes being managed (e.g., by being built into system libraries used for network communications by all of the nodes), or a distinct TM component may operate on behalf of each computing node.

In addition, in embodiments in which the functionality of the DTM system is distributed amongst various system components, various negotiation schemes and protocols are possible. Negotiation requests and other messages related to data transmission policies and permissions that are passed between TM components or between TM components and other system components may be implemented in various manners, such as by sending low-level UDP packets containing the relevant information, or by way of protocols implemented upon higher-level protocols such as HTTP (e.g. XML-RPC, SOAP, etc).

As previously noted, the described techniques may be employed on behalf of numerous computing nodes to provide various benefits to those computing nodes. In addition, such computing nodes may in at least some embodiments further employ additional techniques on their own behalf to provide other capabilities, such as by each configuring and providing their own firewalls for incoming communications, anti-virus protection and protection against other malware, etc.

When the described techniques are used with a group of computing nodes internal to some defined boundary (e.g., nodes within a data center), such as due to an ability to obtain access to the data transmissions initiated by those computing nodes, the described techniques may also in some embodiments be extended to the edge of the defined boundary. Thus, in addition to managing data transmissions between computing nodes within the defined boundary, one or more transmission manager components that may access communications passing through the boundary between internal and external computing nodes may similarly provide at least some of the described techniques for those communications. For example, when a data communication is received at the boundary from an external computing node that is intended for an internal computing node, a transmission manager component associated with the edge may similarly treat the communication as an outgoing data transmission initiated by a managed computing node, such as by queuing the communication and allowing it to be passed into the internal network only if authorization is negotiated and obtained (e.g., by negotiating with a transmission manager component associated with the destination computing node, or instead with a component acting on behalf of all internal computing nodes).

Those skilled in the art will also realize that although in some embodiments the described techniques are employed in the context of a data center housing multiple intercommunicating nodes, other implementation scenarios are also possible. For example, the described techniques may be employed in the context an organization-wide intranet operated by a business or other institution (e.g. university) for the benefit of its employees and/or members. Alternatively, the described techniques could be employed by a network service provider to improve network security, availability, and isolation. In addition, example embodiments may be employed within a data center or other context for a variety of purposes. For example, data center operators or users that sell access to hosted applications to customers may in some embodiments use the described techniques to provide network isolation between their customers' applications and data; software development teams may in some embodiments use the described techniques to provide network isolation between various environments that they use (e.g., development, build, test, deployment, production, etc.); organizations may in some embodiments use the described techniques to isolate the computing resources utilized by one personnel group or department (e.g., human resources) from the computing resources utilized by another personnel group or department (e.g., accounting); or data center operators or users that are deploying a multi-component application (e.g., a multi-tiered business application) may in some embodiments use the described techniques to provide functional decomposition and/or isolation for the various component types (e.g., Web front-ends, database servers, business rules engines, etc.). More generally, the described techniques may be used to partition virtual machines to reflect almost any situation that would conventionally necessitate physical partitioning of distinct computing systems.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A computer-implemented method for providing network isolation between virtual machines of different customers of a program execution service, the computer-implemented method comprising:
   receiving a request to execute a virtual machine of a customer of the program execution service, wherein the request specifies a group of the virtual machines, wherein the group is identified by one or more network address ranges, and wherein the group is associated with a set of access policies for managing incoming and outgoing communications for virtual machines in the group;
   selecting a physical host of the program execution service to use for execution of the virtual machine; and
   managing, based at least in part on the set of access policies, incoming and outgoing communications for the virtual machine executing on the physical host, wherein said managing provides the network isolation.

2. The computer-implemented method of claim 1, further comprising:
   executing the virtual machine on the physical host based on a virtual machine image, wherein the virtual machine image includes an operating system and one or more application programs.

3. The computer-implemented method of claim 2, further comprising:
   executing a plurality of virtual machines based on different virtual machine images,
     wherein individual ones of the virtual machines are associated with user accounts of different customers.

4. The computer-implemented method of claim 1, wherein:
   the request is received via an application programming interface of the program execution service and from a remote computing system of the customer.

5. The computer-implemented method of claim 1, wherein:
   the request to execute the virtual machine includes configuration information that specifies a geographical location of a plurality of geographical locations of the program execution service; and
   the method further comprises executing the virtual machine in the geographical location specified.

6. The computer-implemented method of claim 5, wherein the geographical location is a data center.

7. The computer-implemented method of claim 1, wherein:

the request to execute the virtual machine includes configuration information that specifies one or more criteria for one or more computing resources to be used to execute the virtual machine; and the method further comprises executing the virtual machine using the one or more computing resources specified.

8. The computer-implemented method of claim 7, wherein the one or more criteria for the one or more computing resources includes one or more of an amount of memory, an amount of processor usage, an amount of network bandwidth, an amount of disk space, and an amount of swap space.

9. The computer-implemented method of claim 1, wherein the managing of incoming communications for the virtual machine comprises dropping at least some of the incoming communications to the group according to the set of access policies.

10. The computer-implemented method of claim 1, wherein the managing of outgoing communications for the virtual machine comprises dropping at least some of the outgoing communications to the group according to the set of access policies.

11. The computer-implemented method of claim 1, wherein the set of access policies includes a rule that filters a communication to or from the group based on one or more of:
(a) a source address of the communications,
(b) a target port number of the communication, and
(c) a protocol of the communication.

12. The computer-implemented method of claim 1, further comprising:
during execution of the virtual machine, modifying membership of the group according to configuration information received from the customer.

13. A system, comprising:
one or more computing systems having one or more processors; and
at least one memory including instructions that upon execution by at least one of the one or more processors enable the system to:
receive a request to execute a virtual machine of a customer of a program execution service, wherein the request specifies a group of the virtual machines, wherein the group is identified by one or more network address ranges, and wherein the group is associated with a set of access policies for managing incoming and outgoing communications for virtual machines in the group;
select a physical host of the program execution service to use for execution of the virtual machine; and
manage, based at least in part on the set of access policies, incoming and outgoing communications for the virtual machine executing on the physical host, wherein said management provides the network isolation.

14. The system of claim 13, wherein the instructions upon execution by the at least one processor enable the system to:
execute the virtual machine on the physical host based on a virtual machine image,
wherein the virtual machine image includes an operating system and one or more application programs.

15. The system of claim 14, wherein the instructions upon execution by the at least one processor enable the system to:
execute a plurality of virtual machines based on different virtual machine images,
wherein individual ones of the virtual machines are associated with user accounts of different customers.

16. The system of claim 13, wherein:
the request to execute the virtual machine includes configuration information that specifies a geographical location of a plurality of geographical locations of the program execution service; and
the instructions upon execution by the at least one processor enable the system to execute the virtual machine in the geographical location specified.

17. The system of claim 16, wherein the geographical location is a data center.

18. The system of claim 13, wherein:
the request to execute the virtual machine includes configuration information that specifies one or more criteria for one or more computing resources to be used to execute the virtual machine; and
the instructions upon execution by the at least one processor enable the system to execute the virtual machine using the one or more computing resources specified.

19. The system of claim 18, wherein the one or more criteria for the one or more computing resources includes one or more of an amount of memory, an amount of processor usage, an amount of network bandwidth, an amount of disk space, and an amount of swap space.

20. One or more non-transitory computer readable media storing program instructions that when executed on one or more processors enable the one or more processors to implement at least a portion of a program execution service and to:
receive a request to execute a virtual machine of a customer of the program execution service, wherein the request specifies a group of the virtual machines, wherein the group is identified by one or more network address ranges, and wherein the group is associated with a set of access policies for managing incoming and outgoing communications for virtual machines in the group;
select a physical host of the program execution service to use for execution of the virtual machine; and
manage, based at least in part on the set of access policies, incoming and outgoing communications for the virtual machine executing on the physical host,
wherein said management provides the network isolation.

* * * * *